US00RE38307E

(19) United States
(12) Reissued Patent
Gustafsson et al.

(10) Patent Number: US RE38,307 E
(45) Date of Reissued Patent: Nov. 11, 2003

(54) METHOD AND APPARATUS FOR THREE-DIMENSIONAL MICROSCOPY WITH ENHANCED RESOLUTION

(75) Inventors: Mats G. L. Gustafsson, Stockholm (SE); John W. Sedat, San Francisco, CA (US); David A. Agard, Burlingame, CA (US)

(73) Assignee: The Regents of the University of California, Oakland, CA (US)

(21) Appl. No.: 09/401,041

(22) Filed: Sep. 22, 1999

Related U.S. Patent Documents

Reissue of:
(64) Patent No.: 5,671,085
Issued: Sep. 23, 1997
Appl. No.: 08/384,111
Filed: Feb. 3, 1995

(51) Int. Cl.[7] ..... G02B 21/06; G02B 21/00
(52) U.S. Cl. ..... 359/385; 359/368; 359/370; 359/383
(58) Field of Search ..... 359/368–390; 250/201.3, 458.1, 548; 356/72

(56) References Cited

U.S. PATENT DOCUMENTS

| | | | | | |
|---|---|---|---|---|---|
| 3,846,009 | A | * | 11/1974 | Courtney-Pratt et al. | 359/375 |
| 3,970,841 | A | * | 7/1976 | Green | 250/548 |
| 4,149,249 | A | * | 4/1979 | Pavkovich | 364/413.21 |

(List continued on next page.)

FOREIGN PATENT DOCUMENTS

| | | | | |
|---|---|---|---|---|
| DE | 3918412 | * | 2/1990 | 359/368 |
| DE | 4040441 | * | 7/1992 | |
| EP | 491289 | * | 6/1992 | |
| EP | 0 4910 289 | | 4/1996 | |
| JP | 3137611 | * | 6/1991 | 359/368 |
| RU | 1179253 | * | 9/1985 | 359/368 |

OTHER PUBLICATIONS

Moore, C.L., A Spatially Resolved Spectrally Resolved Photoluminescene Mapping System, Journal of Crystal Growth, vol. 103, pp. 21–27 (1990).*

Hell et al., "Measurement of the 4Pi–confocal point spread function proves 75 nm axial resolution.", Appl. Phys. Lett., Mar. 1994, pp. 1335–1337.*

Hell et al., "Confocal microscopy with an increased detection aperture: type–B confocal microscopy". Optics Letters, Feb. 1994, pp. 222–224.*

(List continued on next page.)

*Primary Examiner*—Thong Nguyen
(74) *Attorney, Agent, or Firm*—John P. O'Banion

(57) ABSTRACT

A method and apparatus for three dimensional optical microscopy is disclosed which employs dual opposing objective lenses about a sample and extended incoherent illumination to provide enhanced depth or Z-direction resolution. In a first embodiment, observed light from both objective lenses are brought into coincidence on an image detector and caused to interfere thereon by optical path length adjustment. In a second embodiment, illuminating light from an extended incoherent light source is detected to the sample through both objective lenses and caused to interfere with a section of the sample by adjusting optical path lengths. Observed light from one objective lens is then recorded. In a third embodiment, which combines the first two embodiments, illuminating light from an extended incoherent light source is directed to the sample through both objective lenses and caused to interfere within a section of the sample by adjusting optical path lengths. The observed light from both lenses is caused to interfere on the image detector by the same optical path length adjustment. *In a fourth embodiment of the invention, further spatial structure is introduced into the illumination light. Computational processing is used to enhance lateral or XY resolution as well as depth or Z resolution.*

141 Claims, 22 Drawing Sheets amended

U.S. PATENT DOCUMENTS

| | | | | | |
|---|---|---|---|---|---|
| 4,187,000 | A | * | 2/1980 | Constant | 359/107 |
| 4,311,358 | A | | 1/1982 | Gibbons et al. | |
| 4,621,911 | A | * | 11/1986 | Lanni et al. | 359/386 |
| 4,725,720 | A | * | 2/1988 | Sawada et al. | 250/201.3 |
| 4,877,960 | A | * | 10/1989 | Messerschmidt et al. | 359/388 |
| 4,877,965 | A | * | 10/1989 | Dandliker et al. | 250/458.1 |
| 4,902,101 | A | * | 2/1990 | Fujihara et al. | 359/383 |
| 4,917,462 | A | | 4/1990 | Lewis et al. | |
| 5,065,103 | A | * | 11/1991 | Slinkman et al. | 324/458 |
| 5,073,018 | A | | 12/1991 | Kino et al. | |
| 5,109,276 | A | * | 4/1992 | Nudelman et al. | 348/47 |
| 5,198,871 | A | * | 3/1993 | Hill, Jr. et al. | 356/318 |
| 5,200,819 | A | * | 4/1993 | Nudelman et al. | 348/65 |
| 5,200,838 | A | * | 4/1993 | Nudelman et al. | 358/443 |
| 5,225,923 | A | | 7/1993 | Montagu | |
| 5,381,224 | A | * | 1/1995 | Dixon et al. | 356/72 |
| 5,386,112 | A | * | 1/1995 | Dixon | 250/234 |
| 5,394,268 | A | * | 2/1995 | Lanni et al. | 359/386 |
| 5,532,874 | A | * | 7/1996 | Stein | 359/383 |
| 5,801,881 | A | | 9/1998 | Lanni et al. | |

OTHER PUBLICATIONS

Hell et al., "Properties of a 4Pi confocal fluorescence microscope", J. Opt. Soc. Am. A., Dec. 1992, pp. 2159–2166.*

Lanni et al., "Excitation field synthesis as a means for obtaining enhanced axial resolution in fluorescence microscopes, Bioimaging" 1993, pp. 187–196.*

Temple, P. A., "Improved dark–field–like surface inspection technique using total internal reflection", Proceedings of the SPIE: Los Alamos Conference on Optics, vol. 190, May 23, 1979, pp. 44–51.

Soviet Patents Abstracts, Section EI, Week 9218, Derwent Publications Ltd., London, GB; Class S03, p. 4, AN 92148427 & SU 1374922 (As Sibe Bio–Phys) Jul. 30, 1991.

Temple, P. A., "Total internal reflection microscopy: a surface inspection technique", Applied Optics, vol. 20, No. 15, Aug. 1, 1981, pp. 2656–2664.

Lanni, F., "Standing–Wave Fluorescence Microscopy", Applications of Fluorescene in the Biomedical Sciences, D. L. Taylor, A. S. Waggoner, R. F. Murphy, F. Lanni, and R. R. Birge, eds., Alan R. Liss, Inc., N.Y., 1986, pp. 505–521.

Lanni, F., "Feedback–stabilized focal plane control for light microscopes", Rev. Sci. Instrum., 64 (6), Jun. 1993, pp. 1474–1477.

Bailey et al., "Enhancement of axial resolution in fluorescence microscopy by standing–wave excitation", Nature, Nov. 1993, pp. 44–48.*

* cited by examiner

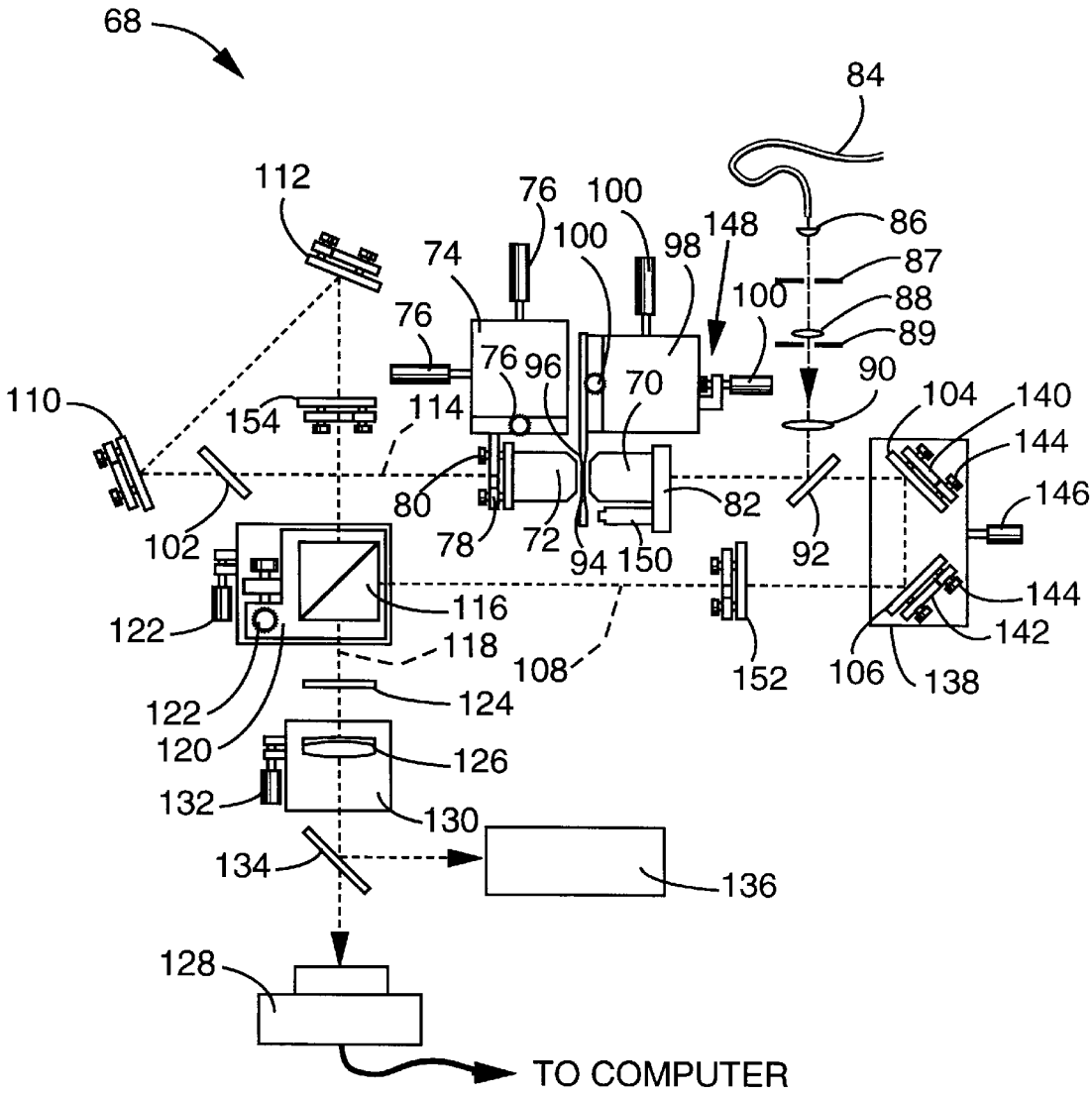
FIG. – 26
amended

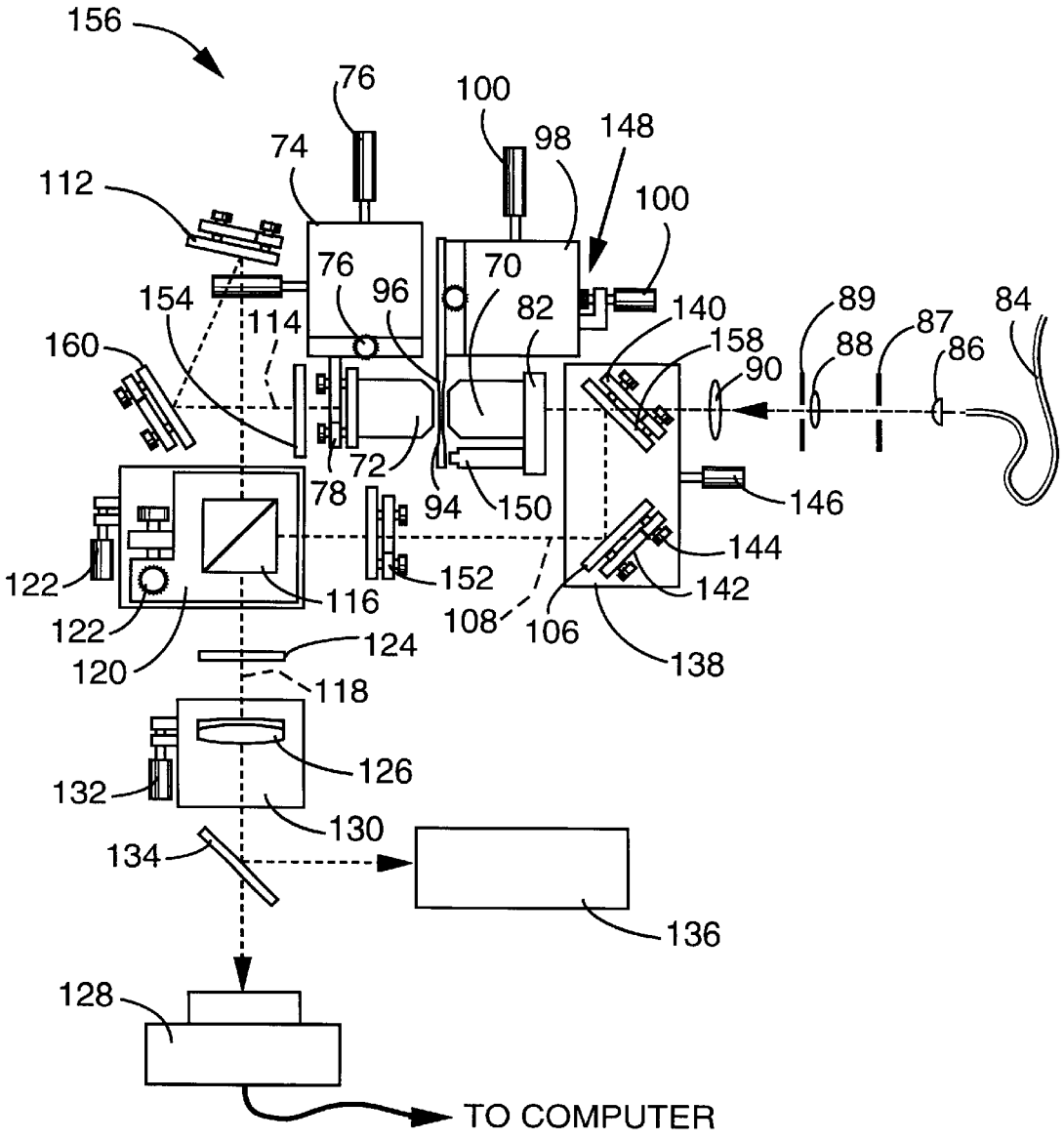
FIG. – 27
amended

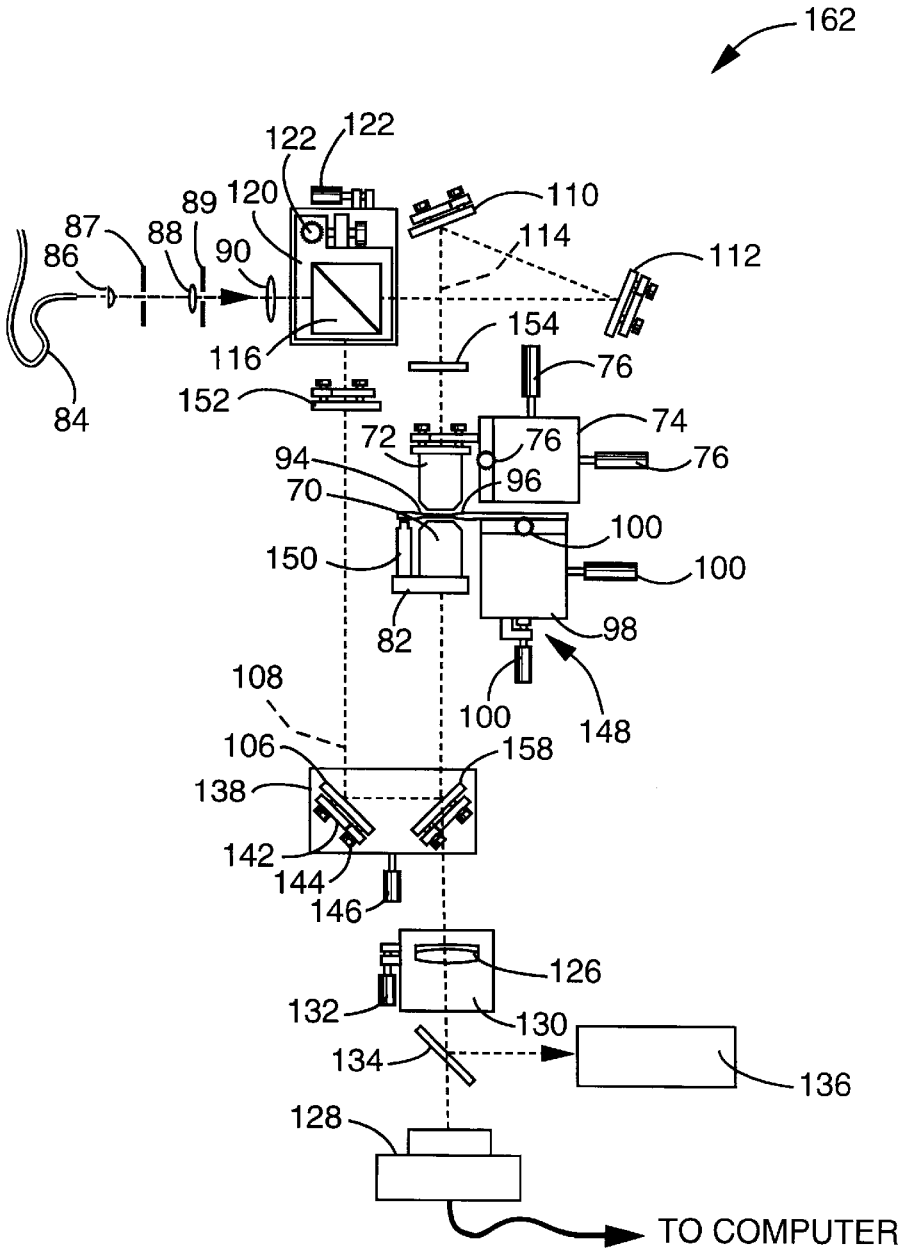
FIG. – 28
amended

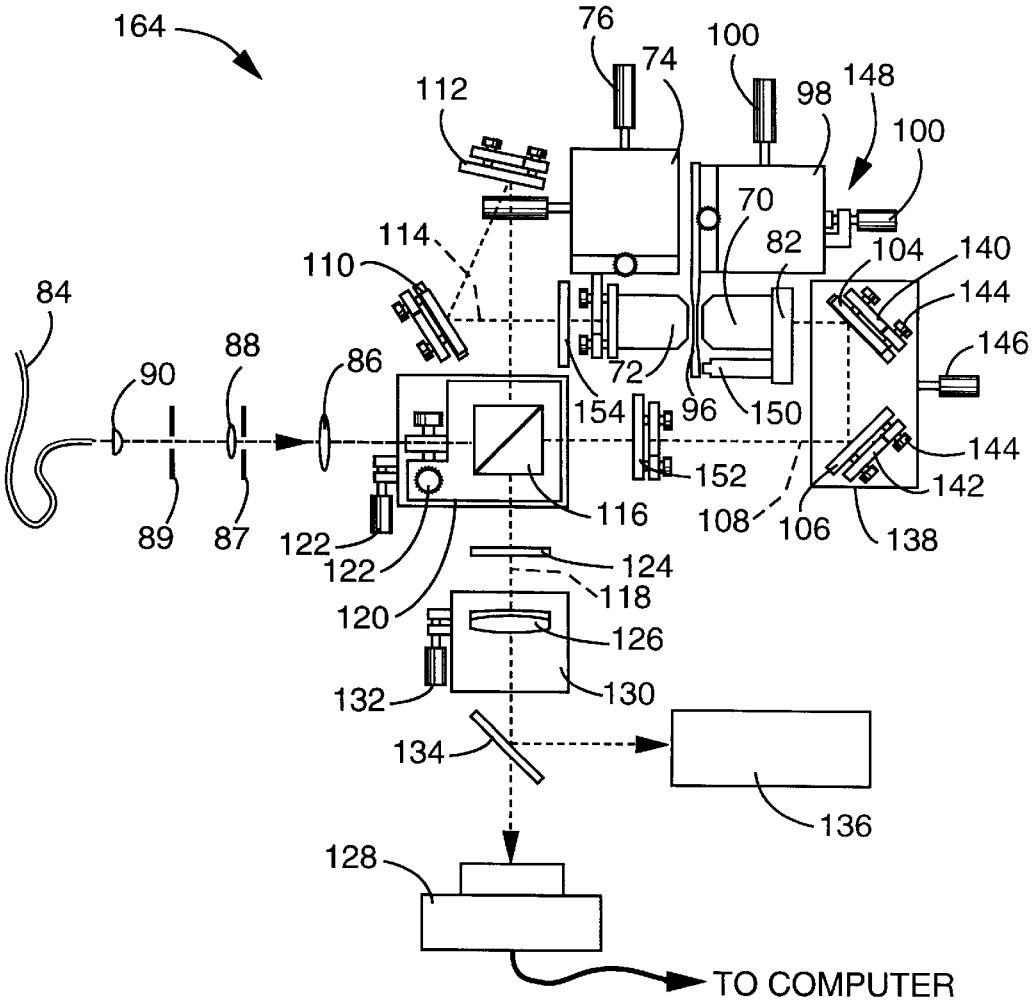
FIG. – 29
amended

METHOD AND APPARATUS FOR THREE-DIMENSIONAL MICROSCOPY WITH ENHANCED RESOLUTION

Matter enclosed in heavy brackets [ ] appears in the original patent but forms no part of this reissue specification; matter printed in italics indicates the additions made by reissue.

[GOVERNMENT SUPPORT]

*STATEMENT REGARDING FEDERALLY SPONSORED RESEARCH OR DEVELOPMENT*

This invention was made with Government support under Grant Nos. GM25101-16 and GM31627-12, awarded by the National Institutes of Health. The Government has certain rights in this invention.

*CROSS-REFERENCE TO RELATED APPLICATIONS*

*Not Applicable*

*REFERENCE TO A MICROFICHE APPENDIX*

*Not Applicable*

BACKGROUND OF THE INVENTION

1. Field of the Invention

The present invention pertains generally to three-dimensional optical microscopy, and more particularly to a method and apparatus for three-dimensional optical microscopy which employs dual opposing objective lenses about a sample to obtain a high level of depth resolution.

2. Description of the Background Art

Optical microscopy has experienced a remarkable renaissance in the medical and biological sciences during the last decade. The increased importance of optical microscopy has been due to new developments in fluorescent probe technology, and the availability of quantitative three-dimensional image data obtained through either computational deconvolution or scanning confocal microscopy.

Optical microscopy offers several advantages over non-optical microscopy techniques. Use of optical microscopy allows viewing of living tissue samples in their natural state. Electron microscopy, in comparison, requires microscopy samples which are dried and exposed to vacuum. Additionally, the interior of the sample can be viewed and mapped in three dimensions using optical microscopy, whereas scanning electron microscopy and other scanned probe microscopies map only the surface of the is sample, and thus cannot provide information about the sample interior. Yet another advantage of optical microscopy is that particular cellular components can be recognized and mapped out with great specificity by staining with fluorescent probes. It is now possible to synthesize fluorescent probes with specificity for nearly any given biomolecule.

The only important drawback to optical microscopy is its limited resolution, which is related to the angle over which the objective lens can collect light, and ultimately from the finite wavelength of light. Thus, any technology such as the present invention that significantly increases the resolution of optical microscopy will have important applications in cellular biology, medical imaging, and other biotechnology fields.

Presently there are two primary approaches to three-dimensional optical microscopy: optical sectioning microscopy, which is also known as computational deconvolution, and scanning confocal microscopy.

In optical sectioning microscopy, a series of images of the microscopy sample are acquired, with the focus moved successively through sections of the sample to obtain successive images. Each image contains in-focus information from the parts or sections of the sample which are in the focal plane, and blurred, out-of-focus information from the other parts of the sample. Analysis of the entire data set by computer allows reconstruction of the three-dimensional structure of the sample. The reconstruction process employs computational algorithms and a previously stored reference data set describing the blur caused by a single point source. Optical sectioning microscopy is a "widefield" microscopy in which large area images are recorded, typically by a charge-coupled device array (CCD) camera. Thus, high light throughput and high data acquisition speeds are possible with this technique.

In confocal microscopy, a focused laser beam is used as a light source, and light is detected by a photomultiplier tube through a pinhole which is focused onto the same spot in the sample as the laser. This combined focal point is then scanned in three dimensions through the sample, and the detected intensity as a function of spot position is used to obtain a three-dimensional image of the sample. The pinhole partially suppresses out-of-focus information and improves the resolution, but at the cost of discarding much of the light. This loss of light necessitates long exposure times, which makes operation slow and often causes severe sample bleaching problems. Confocal microscopy operations are further slowed down by the fact that the data pixels are acquired one at a time, as opposed to up to a million in parallel for the large area imaging employed in optical sectioning microscopy.

Both optical sectioning microscopy and confocal microscopy suffer an important drawback in that the depth resolution or Z-direction resolution is several times worse than that in the transverse, or XY, plane. The limitation on Z-direction resolution is caused by fundamental geometrical limitations which are discussed in detail below. The present invention provides a method and apparatus for optical microscopy in which the Z-resolution is not only equal to that of the resolution in the XY plane, but is increased to more than double the resolution in the XY plane obtained heretofore with optical sectioning microscopy. This increase in Z-direction resolution is achieved by the present invention while also maintaining the high light throughput and data acquisition speeds available through optical sectioning microscopy.

There are two previously known optical microscopy methods which employ dual opposing objective lenses. One method, which is known as 4Pi Confocal Microscopy, is a confocal, rather than a widefield, microscopic method. 4Pi Confocal Microscopy can generally be employed in three ways. In a first mode, focused laser light is used to illuminate a sample from both objective lenses and interfere in the sample. In a second mode the emitted light is collected from both directions and combined onto a single pinhole detector. The third mode involves the combination of the first two modes simultaneously. Being a confocal technique, however, all modes of 4Pi Confocal Microscopy have poor light throughput and lengthy data acquisition times due to loss of light caused by the pinhole [photodector] *photodetector* and the slowness of the pixel-by-pixel data acquisition.

The second known optical microscopy method which employs two opposing lenses is generally called Standing Wave Fluorescence Microscopy (SWFM). This technique requires a light source with great temporal and spatial coherence, typically in the form of a laser. The spatially and temporally coherent light source results in an interference pattern in sample space which is a sinusoidal standing wave (hence the name) that extends throughout the observed region of the sample.

SWFM could in principle achieve similar Z resolution as one embodiment of the present invention (the $I^3M$ embodiment described herein) but only by combining several different standing wave patterns in sequence through use of scanning mirrors on similar dynamic devices, or by using multiple individually coherent but mutually incoherent light sources, such as a plurality of lasers. The present invention provides the increased Z-direction resolution without requiring such moving parts, requires only a single, spatially incoherent light source such as an arc lamp or incandescent bulb, and does not require temporal coherence beyond that exhibited by any band-limited light source. The use of a simple incoherent light source allows free choice of wavelength of the illumination light, while lasers are available in only a limited selection of wavelengths. Furthermore, one embodiment of the present invention (the $I^5M$ embodiment described herein) achieves greater Z resolution than is possible through SWFM alone.

Thus, the present invention differs from, and has advantages compared to, all previously known 3D microscopy techniques. Compared to any mode of microscopy that uses a single objective lens, the present invention offers higher Z resolution. Compared to SWFM, the present invention uses simpler illumination means and offers a greater selection of illumination wavelengths, and in one of its embodiments offers higher Z resolution. Compared to 4Pi Confocal Microscopy, the present invention offers simpler illumination means, a greater selection of illumination wavelengths, greater data acquisition speed, and more efficient use of observed or emitted light, which can lead to less severe sample bleaching.

Thus, there is a need for a method and apparatus for three-dimensional optical microscopy which provides greatly enhanced depth or Z-direction resolution, which has a high light throughput, which has a high data acquisition speed, and which does not require use of spatially coherent light sources. The present invention satisfies these needs, as well as others, and generally overcomes the deficiencies found in known optical microscopy devices and methods.

SUMMARY OF THE INVENTION

The present invention generally pertains to a method and apparatus for three-dimensional optical microscopy which employs dual opposing objective lenses about a sample. There are three preferred embodiments of the invention which, employing essentially the same apparatus, allow the sample to be illuminated from one or both objective lenses, and to be observed and recorded through one or both objective lenses.

By way of example and not of limitation, the present invention generally includes first and second objective lenses which are mounted opposite to each other about a thin sample, with at least one of the objective lenses including translational adjustment means. Illuminating means, preferably in the form of one or more arc lamps or other extended spatially incoherent light source, provides illumination for the sample. The invention generally includes beam splitter and beam combiner means, preferably in the form of a beam splitter/recombiner cube, for splitting the illuminating light into two paths so that it may be directed to the sample through both objective lenses, and for combining observed or emitted light from both objective lenses for recording. A plurality of adjustable mirrors allow the direction of illuminating and/or observed light to and from the objective lenses and image recording means. The image recording means preferably comprises a CCD camera. Means for selectively transmitting and reflecting light of different wavelengths, preferably in the form of one or more dichroic mirrors, are generally included in the invention. Optical path length adjustment means, preferably in the form of a translating stage with one or more suitably positioned mirrors, allows [timing] *tuning* of optical path lengths. Phase compensation means, preferably in the form of chromatic phase compensator plates, may be included for compensation of phase differences between illuminating and observed or emitted light, and/or between different wavelength components within the illumination light and/or within the observed or emitted light. Alignment means for positioning the sample relative to the objective lenses are provided, which preferably include a removable mirror and eyepiece. The invention also may employ vibration isolation supporting means such as a vibration isolated platform or housing.

In a first embodiment of the present invention the two opposing objective lenses are used to a sample simultaneously to obtain two images of the sample, while illuminating light is generally directed to the sample from one objective lens. The two images from the two objective lenses are combined and brought into coincidence on the CCD camera or other imaging means. The optical lengths of the two optical paths from the two objective lenses are adjusted to differ by less than the coherence length of the light emitted from the sample, and preferably by significantly less than a wavelength of the observed or emitted light. The two images will then interfere on the CCD camera to provide sample information. The enhanced depth or Z-resolution information provided by the present invention stems from the interference of these two images when they are combined coherently on the same CCD camera with the length of the two optical paths carefully balanced. While the first embodiment of the present invention is generally described herein in the context of fluorescence microscopy, it will be readily understood by persons skilled in the art that this embodiment is applicable to most other modes of optical microscopy as well, including brightfield, darkfield, and phase contrast microscopies. The first embodiment of the present invention is generally called "Image Interference Microscopy" or $I^2$ microscopy, and for convenience and clarity will hereinafter be referred to as the $I^2M$ embodiment. The operation of the $I^2M$ embodiment of the invention, as well as the other embodiments related below, proceeds in a manner similar to that used in standard optical sectioning microscopy: a series of images of the sample are acquired at different focal planes, with the whole data set being computationally deconvolved to remove the out-of-focus blur by using a previously measured sample of the blur caused by a point source.

In a second embodiment of the invention, which applies primarily to fluorescence or phosphorescence microscopy, illuminating or excitation light from an extended, spatially incoherent source is split by beam splitting means, and used to illuminate the sample from both sides simultaneously through both opposed objective lenses. When the optical path lengths are balanced, the two illumination beams interfere at the focal plane of the two objectives. This narrow interference fringe causes the illumination intensity to vary with depth, Z, in a thin slice or region of the sample surrounding the focal plane. This spatial structure of the illumination light causes a corresponding modulation of the fluorescent emission from the sample, which is the source of the increased Z-direction resolution. In the second embodiment the sample is generally observed through a single objective lens. The second embodiment of the invention is called "Incoherent Interference Illumination" or $I^3$ microscopy, and for convenience and clarity will hereinafter be referred to as the $I^3M$ embodiment of the invention.

In a third embodiment of the invention, the $I^2M$ embodiment and $I^3M$ embodiment are combined and, using essentially the same apparatus, achieve greater Z-direction resolution than is possible with either the $I^2M$ or $I^3M$ embodiments alone. The third embodiment is hereinafter referred to as the $I_5$ microscopy or $I^5M$ embodiment since it involves a combination of the $I^2M$ and $I^3M$ embodiments. In the $I^5M$ embodiment, the sample is observed through both lenses as in the $I^2M$ embodiment, while the sample is illuminated from both objective lenses as in the $I^3M$ embodiment. The same beam splitter may be used for both the illumination light and the observed light, since the necessary alignment is essentially identical for both.

An object of the invention is to provide a method and apparatus for three-dimensional optical microscopy which provides greatly enhanced depth or Z-direction resolution.

Another object of the invention is to provide a method and apparatus for three-dimensional optical microscopy which has high light throughput.

Another object of the invention is to provide a method and apparatus for three-dimensional optical microscopy which allows high data acquisition speed.

Another object of the invention is to provide a method and apparatus for three-dimensional optical microscopy which does not require use of a coherent light source.

Another object of the invention is to provide a method and apparatus for three-dimensional optical microscopy which does not cause unnecessary bleaching of samples.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only:

FIG. 26 is a plan view of the $I^2M$ embodiment of the present invention.

FIG. 27 is plan view of a more compact version of the $I^2M$ embodiment shown in FIG. 26.

FIG. 28 is a plan view of the $I^3M$ embodiment of the present invention.

FIG. 29 is a plan view of the $I^5M$ embodiment of the present invention.

DESCRIPTION OF THE PREFERRED EMBODIMENTS

Referring more specifically to the drawings, for illustrative purposes the method and apparatus comprising the present invention and the underlying theory behind the invention are generally shown in FIG. 1 through FIG. 50. It will be appreciated that the apparatus of the invention may vary as to configuration and as to details of the parts, and that the method of the invention may vary as to the steps and their sequence, without departing from the basic concepts as disclosed herein.

Figure 1:
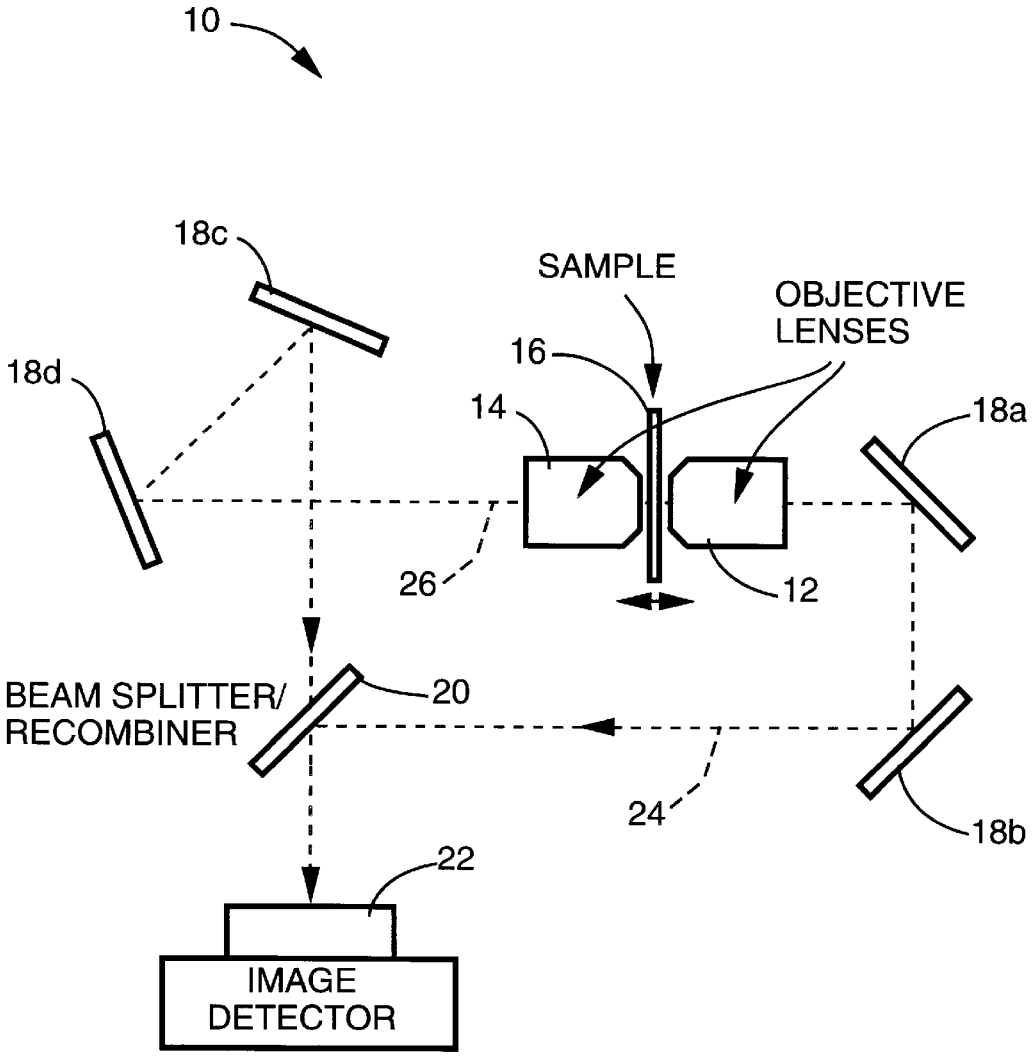
FIG. 1 is a schematic diagram of a first ($I^2M$) embodiment of an optical microscope in accordance with the present invention.

Referring first to FIG. 1, a simplified schematic diagram of a microscope apparatus 10 in accordance with the first or $I^2M$ embodiment of the present invention is generally shown. A first objective lens 12 and a second objective lens 14 are mounted about a sample 16, with objective lenses 12, 14 being focused, from opposite directions, on one and the same section or plane of sample 16. Sample 16 is preferably thin and mounted between two cover glasses. The observed light or images from first and second objective lenses 12, 14 is reflected by a plurality of mirrors 18 along paths 24, 26 respectively and directed to beam splitting and recombining means, preferably in the form of beam splitter/recombiner 20. The observed light or images from objective lenses 12, 14 are brought into coincidence on image detection means 22 for image recording by mirrors 18 and beam splitter/recombiner 20. Preferably, image detection means 22 is a CCD camera or the like. The optical lengths of the two optical paths 24, 26 are adjusted to differ by less than the coherence length of the emitted light. Optical path length adjustment is carried out by suitable means (not shown)

which are discussed below in more detail. Once optical path lengths 24, 26 are adjusted, the observed light or images from first and second objective lenses 12, 14 will interfere on image detection means 22. Generally, illuminating light from illuminating means (not shown) is directed to sample 16 through one of the objective lenses 12 or 14 using a beam splitter, which may or may not be dichroic, and may or may not also serve as one of the mirrors 18a or 18d. The image from the interfering observed light is recorded by image detection means 22 and stored by data processing means (not shown) which are interfaced with image detection means 22.

The operation of the microscope apparatus 10 proceeds in a fashion which is generally similar to standard optical sectioning microscopy. After the observed light or images of the section of sample 16 are recorded by image detection means, objective lenses 12, 14 are focused on another section or plane within sample 16 using sample positioning means (not shown) to obtain another image corresponding to the new section. A series of images of the sample are acquired at different focal planes, and a data set of images for the desired portions of sample 16 is formed from the series of images. As in optical sectioning microscopy, each image includes in-focus information from sample 16 from the section or focal plane in which first and second objective lenses 12, 14 are focused, as well as out-of-focus or blurred information from the sections of sample 16 which are outside the focal plane. The entire data set is computationally processed (a process we will generally refer to, without implying limitation, as deconvolution) to remove the out-of-focus blur, using a previously measured sample of the blur caused by a point source. Image detection means 22 is preferably interfaced to a microprocessor or other data processing means (not shown) to facilitate computational deconvolution of the data set from sample 16.

The enhanced Z-direction resolution results from essentially the same physical process that takes place in a standard microscope with a single objective. Resolution in a standard single objective microscope can be regarded as generated by the interference between light emitted in different directions, leading to the well known fact that objective lenses of larger aperture[;], i.e. which accept light with a larger range of angles, [and thus] have greater resolution. The present invention extends this process to include light emitted in "backward," as well as "forward," directions by employing two opposing objective lenses.

Several arrangements of mirrors 18 may be employed for microscope apparatus 10, and the mirror arrangement shown in FIG. 1 is one of the simplest preferred arrangements. It will be appreciated that some arrangements of mirrors 18 will not work with the present invention as shown in FIG. 1 because the images from one of the objective lenses 12, 14 will become inverted relative to the image from the other lens.

The $I^2M$ embodiment of the present invention as shown in FIG. 1 is generally applicable to fluorescence microscopy. However, it will be apparent to those skilled in the art that this embodiment is also applicable to brightfield, darkfield, phase contrast, and other modes of optical microscopy. Thus, when the present invention is employed for fluorescence microscopy or phosphorescence microscopy, the term "observed light" from the objective lenses as related herein is used to refer generally to emitted light from a sample, and the term "illuminating light" generally refers to excitation light. When non-luminescent types of microscopy are employed, "observed light" generally refers to light reflected by or transmitted through a sample.

Figure 2:
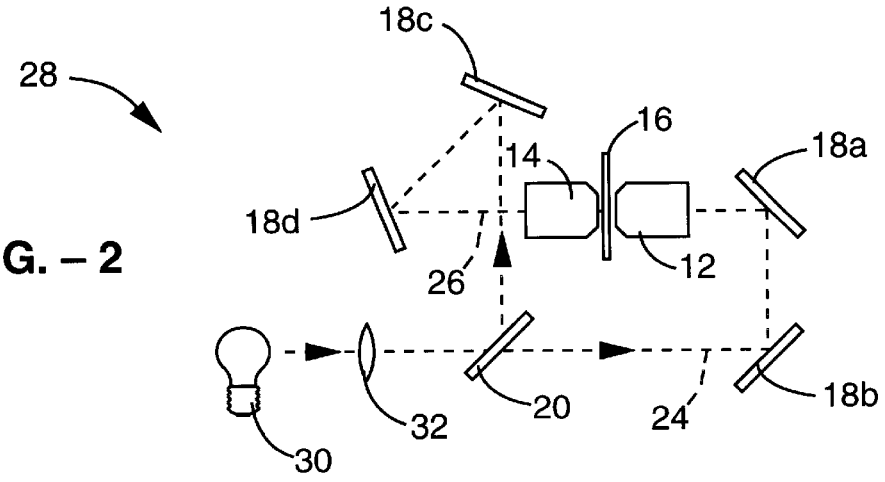
FIG. 2 is a schematic diagram of an optical microscope as generally used in a second ($I^3M$) embodiment and a third ($I^5M$) embodiment of the present invention.

Referring next to FIG. 2, a simplified schematic diagram of a microscope apparatus 28 is shown which is suitable for use in the second or $I^3M$ embodiment and third or $I^5M$ embodiment of the present invention, wherein like reference numerals denote like parts. As can be seen by referring also to FIG. 1, the $I^3M$ and $I^5M$ embodiments employ generally the same apparatus as used in the $I^2M$ embodiment, with the primary difference being that illuminating light, preferably from a spatially incoherent light source 30, is directed initially to beam splitter/recombiner 20 by an illumination focusing means generally comprising one or more lenses or mirrors and depicted schematically as lens 32, rather than directed initially to sample 16 as in the $I^2M$ embodiment. The $I^3M$ and $I^5M$ embodiments of the present invention as shown in FIG. 2 are contemplated for use primarily with luminescent microscopies, though they can be used with other modes of microscopy. Thus, in the $I^3M$ and $I^5M$ embodiments the term "illuminating light" will generally refer to excitation light, and the term "observed light" will generally refer to emitted light from a sample.

The illuminating light in apparatus 28 of FIG. 2 is split into two beams by beam splitter/recombiner 20, and directed by mirrors 18 to first and second objective lenses 12, 14 along paths 24, 26 respectively. The illuminating light is focused and brought into coincidence on a section or plane of sample 16 by objective lenses 12, 14. As in the $I^2M$ embodiment, the optical lengths of two optical paths 24, 26 are adjusted by suitable means (not shown) to be closely equal. This adjustment of optical path lengths 24, 26 results in interference of the illuminating light within the focal plane of sample 16. Thus, in the $I^3M$ and $I^5M$ embodiments of the present invention, the illuminating light is brought into interference in the focal plane of a section of sample 16 rather than the observed light on the detection means as in the $I^2M$ embodiment. However, all three embodiments use essentially the same apparatus, as can be seen by comparing FIG. 1 and FIG. 2.

Figure 3:
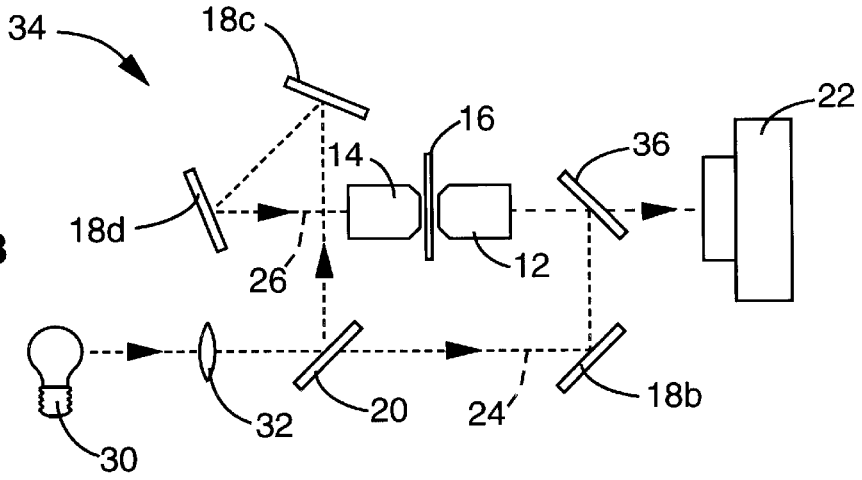
FIG. 3 is a schematic diagram of the $I^3M$ embodiment of an optical microscope.
Figure 4:
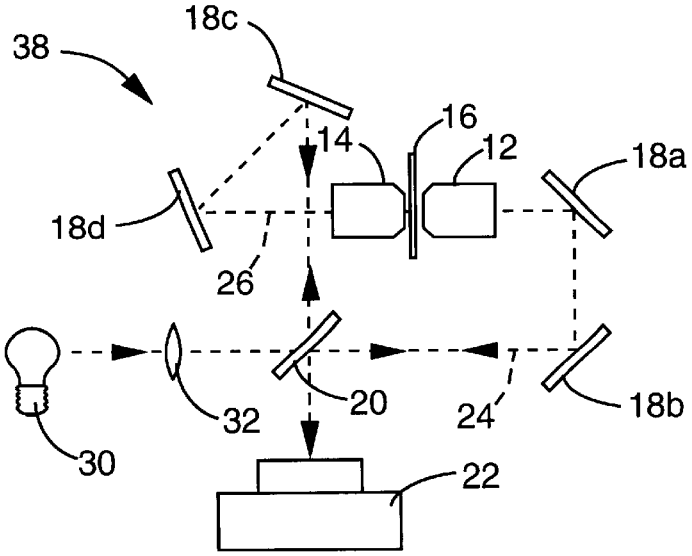
FIG. 4 is a schematic diagram of the $I^5M$ embodiment of an optical microscope wherein shared beam splitting optics are employed for illuminating and detected light.

Referring now to FIG. 3 and FIG. 4, which show the $I^3M$ and $I^5M$ embodiments of the present invention respectively, it can be seen that the primary difference between the apparatus comprising the $I^3M$ and $I^5M$ embodiments is the position of image detection means 22. [Focussing] *Focusing* means (not shown), generally lenses, may be used to focus the image onto image detection means 22. Referring more particularly to FIG. 3, an apparatus 34 in accordance with the $I^3M$ embodiment of the present invention is generally shown, wherein image detection means 22 records observed light from first objective lens 12 alone. Observed light from first objective lens 12 reaches image detection means 22 through selective reflectance and transmittance means, shown here as beam splitter 36 (which may be dichroic) which selectively transmits observed or emitted light from first objective lens 12 to image detection means 22, while selectively reflecting illuminating or excitation light away from image detection means 22. Beam splitter 36 may occupy generally the same position as mirror 18a in the $I^2M$ and $I^5M$ embodiments, or may be a separate component.

Referring more particularly to FIG. 4, an apparatus 38 in accordance with the $I^5M$ embodiment of the present invention is generally shown, wherein image detection means 22 is positioned adjacent to beam splitter/recombiner 20 for recording observed light from both first and second objective lenses 12, 14. [Focussing] *Focusing* means (not shown), such as lenses, may also be included between beam splitter/recombiner 20 and image detection means 22 if desired. The $I^5M$ embodiment of the present invention records interfering images on image detection means 22, as in the $I^2M$ embodiment, and causes illuminating light from first and second objective lenses to interfere within sample 16 as in the $I^3M$ embodiment, and thus is merely a combination of these two embodiments. The same optical path length adjustment which causes illuminating light to coincide and interfere within the focal plane of a section of sample 16 results in coincidence and interference of observed light on image detection means 22, and thus in many instances the same apparatus may be used for both $I^2M$ and $I^3M$ embodiments by simply moving the light source 30.

Figure 5:
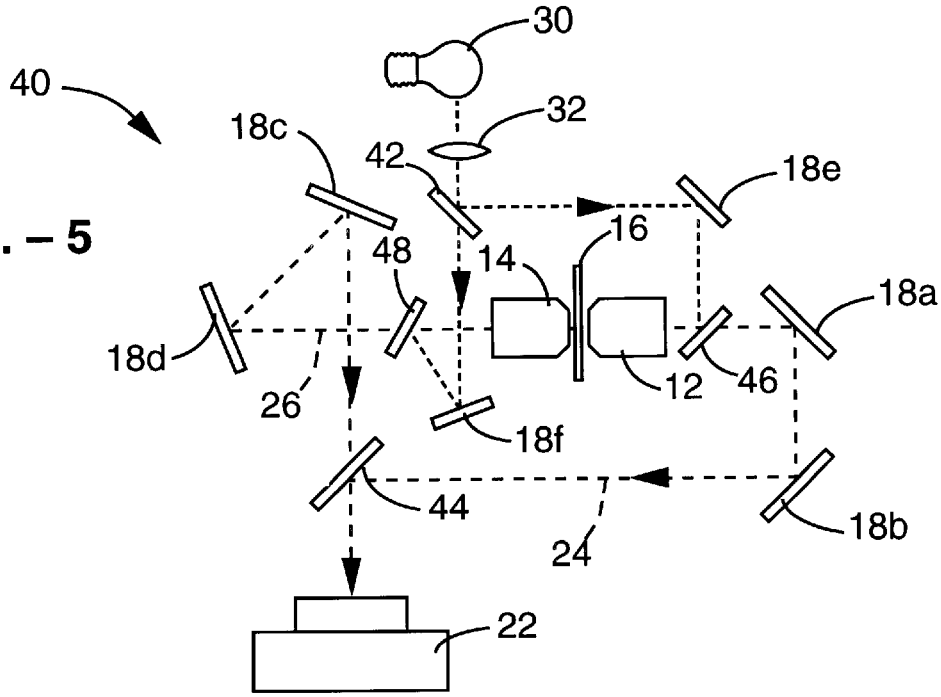
FIG. 5 is a schematic diagram of the $I^5M$ embodiment of an optical microscope wherein separate beam splitting optics are employed for illuminating and detected light.
Figure 6:
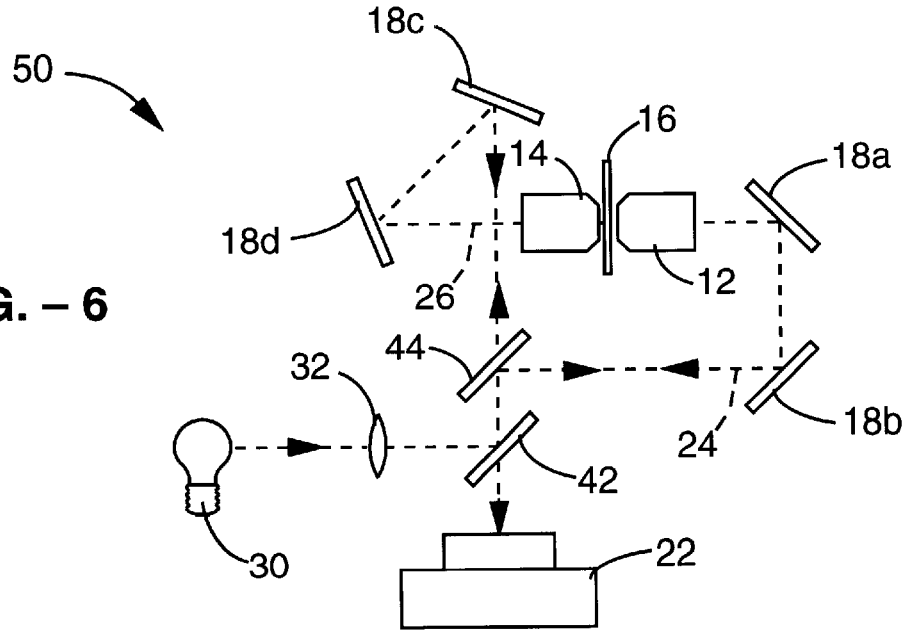
FIG. 6 shows the schematic diagram of the $I^5M$ embodiment of an optical microscope with an additional beam splitter included adjacent to the illumination source and image detector.

Several mirror and beam splitter/recombiner arrangements are contemplated for each embodiment of the invention, with the $I^5M$ embodiment perhaps having the greatest possible number of configurations. As shown in FIG. 4, apparatus 38 employs a single beam splitter/recombiner 20 which both splits illuminating light and recombines observed light for detection by image detection means 22. The apparatus 40 shown in FIG. 5 employs separate beam splitter/recombiners 42, 44 for splitting illuminating light and combining observed light respectively, to achieve the same beam splitting and recombining effected by apparatus 38 in FIG. 4. Additional mirrors 18e, 18f, and dichroic mirrors 46, 48, are required for use of separate beam splitters 42, 44 in FIG. 5. Shown in FIG. 6 as apparatus 50 is yet another possible arrangement of separate beam splitter/recombiners 42, 44 in accordance with the $I^5M$ embodiment which does not require additional mirrors or dichroic mirrors. Possible advantages for each of the arrangements shown in FIG. 4 through FIG. 6 are discussed below.

The operation of the microscope apparatus shown in FIG. 2 through FIG. 6 in accordance with the $I^3M$ and $I^5M$ embodiments of the present invention proceeds in the same manner related above for the $I^2M$ embodiment. After the observed light or images of the section of sample 16 are recorded by image detection means 22, objective lenses 12, 14 are focused on another section or plane within sample 16 by moving the sample using sample positioning means (not shown) to obtain another image corresponding to the new section. A series of images of the sample are acquired at different focal planes, and a data set of images for the desired portions of sample 16 is formed. The entire data set is computationally deconvolved to obtain three dimensional sample information with enhanced Z-direction resolution.

The present invention will be more fully understood by referring to FIG. 7 through FIG. 25, which relate generally the theory behind the present invention and the physical basis for the enhanced Z-direction resolution achieved by the present invention. Graphic representations of various three dimensional functions included in FIG. 7 through FIG. 25 are shown generally in the $k_Y$ and $k_Z$ plane of Fourier space.

As related above, the reconstruction process in currently used optical sectioning microscopy employs a reference data set which describes the blur from a point source. This reference blur is generally known as the "point spread function" of the microscope and characterizes its optical properties. The Fourier transform of the point spread function is known generally as the "optical transfer function" or OTF, and describes to what extent the different spatial frequency components of the sample information are represented in the data. For reasons outlined below, the optical transfer function of any optical imaging system is zero everywhere except within a certain finite region which is generally called the "region of support". Thus, only those spatial frequencies of the sample which lie within the region of support influence the sample data, and no information is contained in the data set about any other spatial frequencies. Since the computational reconstruction can be made more accurate the more information about the sample is available, it is thus advantageous for a microscope to have as large as possible a region of support of its optical transfer function. The size and shape of the region of support of the optical transfer function for a three-dimensional optical microscope is determined by the angle over which the objective lens can accept light. The $I^2M$ embodiment of the present invention extends the solid angle over which light is collected, thereby increasing the resolution.

Figure 7:
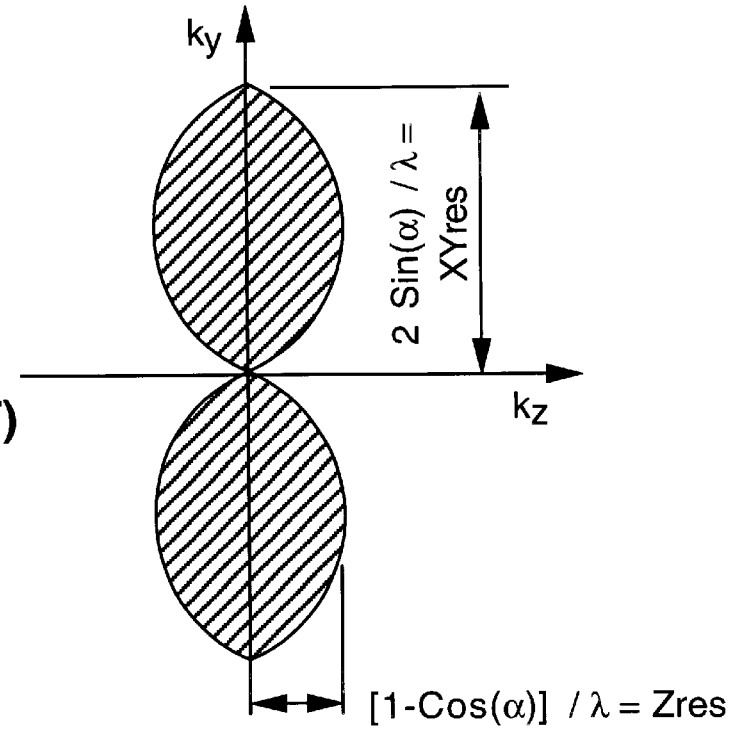
FIG. – 7 (PRIOR ART)
FIG. 7 is a graphic representation of the region of support of the incoherent optical transfer function obtained through conventional widefield optical sectioning microscopy, shown generally in the $k_Yk_Z$ plane, i.e., in the plane of Fourier space spanned by the $k_Y$ and $k_Z$ axes, which correspond to the Y and Z axes of real space, respectively.

FIG. 7 shows generally, in graphic representation in the YZ plane, the region of support of the incoherent optical transfer function obtained through conventional optical sectioning microscopy. The Z-direction resolution obtained through the conventional microscopy is described generally by the equation $$Zres=[1-\mathrm{Cos}(\alpha)]/\lambda$$

where $\alpha$ is the angle over which the objective lens can collect light, and $\lambda$ is the wavelength in the sample medium of the observed or emitted light. In contrast, FIG. 8 shows the corresponding region of support of the incoherent optical transfer function obtained with the $I^2M$ embodiment of the present invention, which provides a Z direction resolution described by the equation $$Zres=2/\lambda$$

where $\lambda$ is the wavelength in the sample medium of observed or emitted light. Both graphs represent three-dimensional objects, rotationally symmetric about the $k_Z$ axis. As can readily be seen, the present invention provides significantly increased Z-direction resolution over state of the art optical sectioning microscopy.

Figure 8:
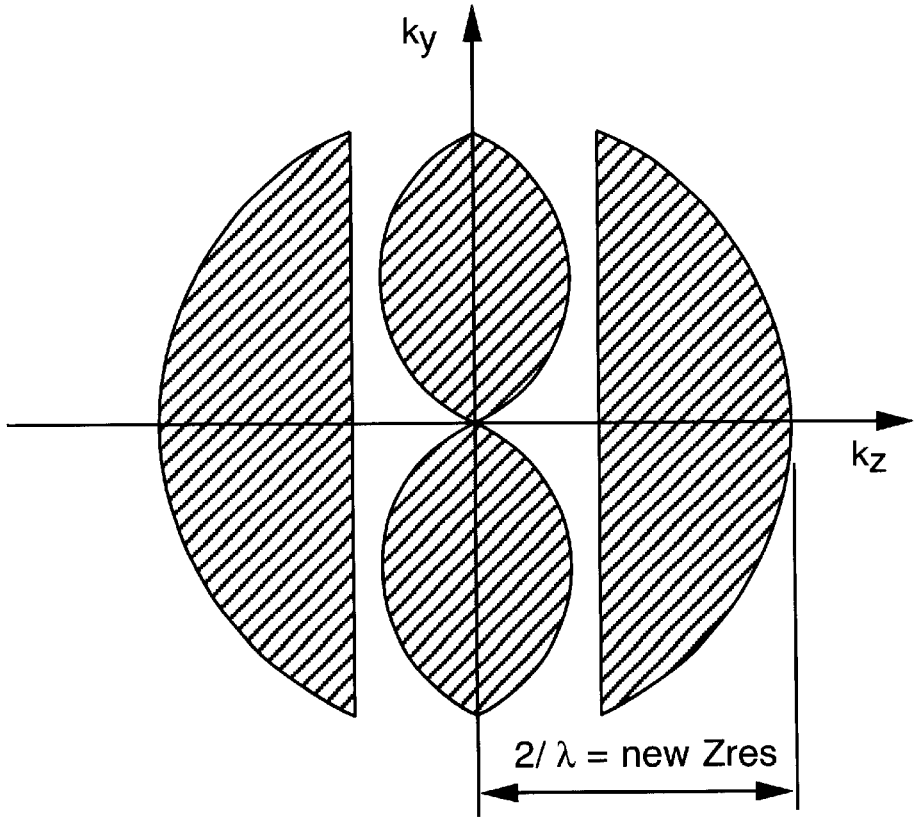
FIG. 8 is a graphic representation of the region of support of the incoherent optical transfer function obtained through $I^2M$ embodiment of the present invention, shown generally in the [$h_Yk_Z$] $k_Yk_Z$ plane.
Figure 9:
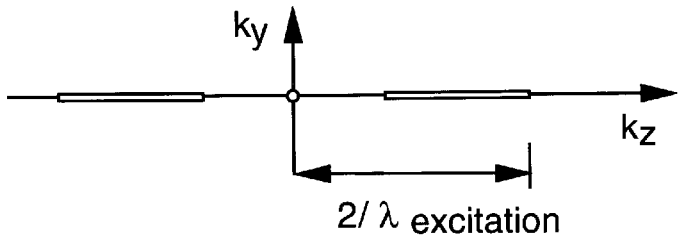
FIG. 9 is a graphic representation of the region of support of the spatial frequency content of the illuminating light intensity used in the $I^3M$ and $I^5M$ embodiments of the present invention, shown generally in the $k_Yk_Z$ plane.

The introduction of the illumination method characteristic of the $I^3M$ and $I^5M$ embodiments of the present invention changes the optical transfer functions shown in FIG. 7 and FIG. 8 by convolving them with the function shown in FIG. 9. FIG. 9 shows generally the region of support for the spatial frequency content of the illuminating or excitation light generally used in the $I^3M$ and $I^5M$ embodiments of the present invention. Thus, the optical transfer function of the $I^3M$ embodiment is given by the convolution of the functions shown in FIG. 7 and FIG. 9, which results in the region of support shown generally in FIG. 10. The $I^3M$ embodiment thus provides a Z-direction resolution described by the equation $$Zres=2/\lambda_{excitation}+[1-\mathrm{Cos}(\alpha)]\lambda_{emission}.$$

Figure 11:
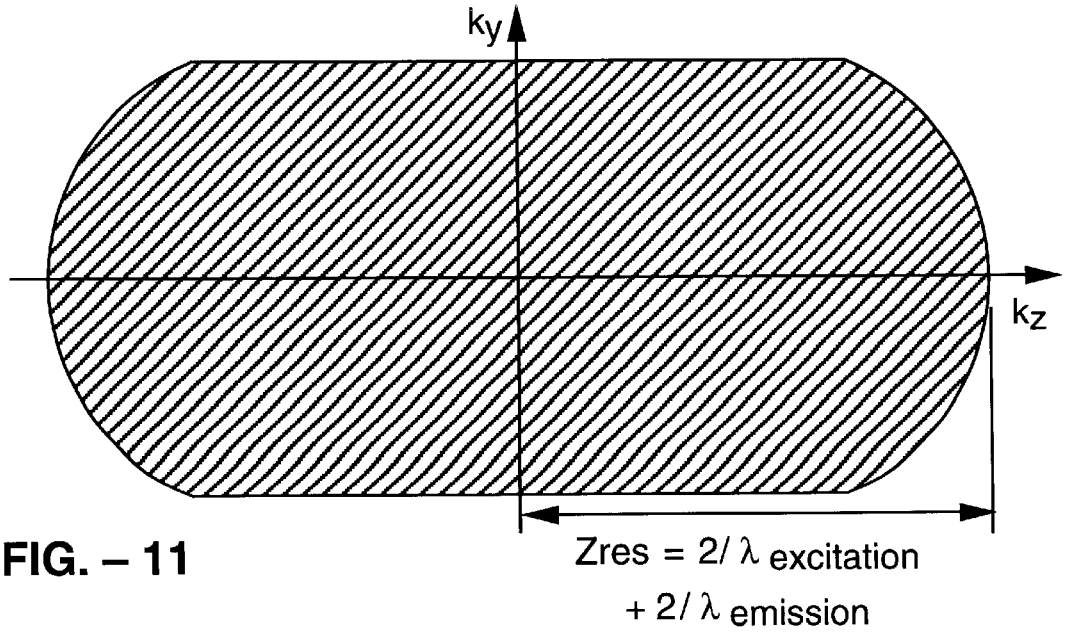
FIG. 11 is a graphic representation of the region of support of the incoherent optical transfer function obtained through the $I^5M$ embodiment of the present invention, shown generally in the $k_Yk_Z$ plane.

Similarly, the region of support for the optical transfer function of the $I^5M$ embodiment, shown generally in FIG. 11, is obtained by the convolution of the functions shown in FIG. 8 and FIG. 9. The region of support of the optical transfer function for the $I^5M$ embodiment is described by the equation $$Zres=2/\lambda_{excitation}+2/\lambda_{emission}.$$

Figure 10:
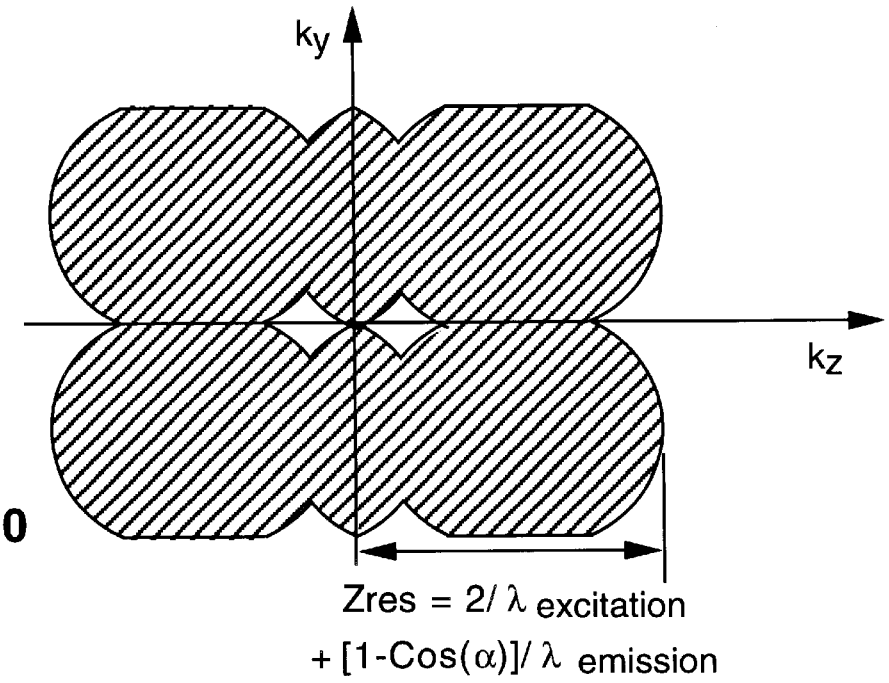
FIG. 10 is a graphic representation of the region of support of the incoherent optical transfer function obtained through the $I^3M$ embodiment of the present invention, shown generally in the $k_Yk_Z$ plane.

Note that the optical transfer function for the $I^5M$ embodiment not only more than doubles the Z-resolution obtained with the $I^2M$ embodiment, but also fills the "gaps" in the $I^2M$ optical transfer function regions of support shown in FIG. 8 and FIG. 10.

Figure 12:
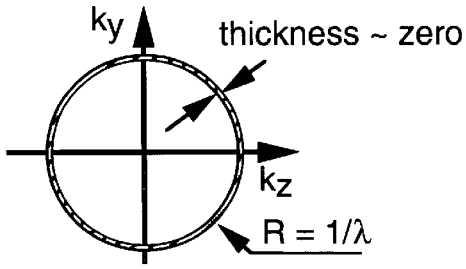
FIG. 12 is a graphic representation of the spatial frequency components or coherent transfer function in Fourier space of the emitted light from a sample, shown generally in the $k_Yk_Z$ plane.
Figure 13:
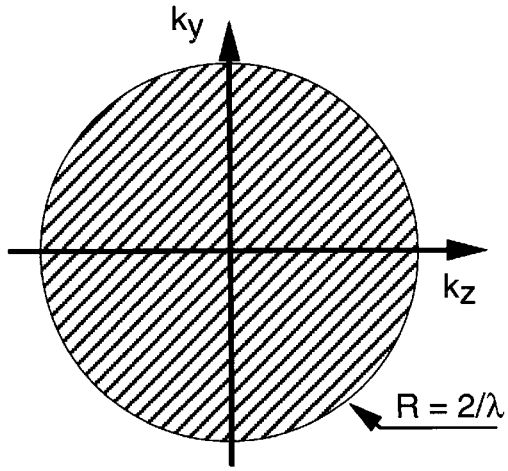
FIG. 13 is a graphic representation of the autocorrelation function or incoherent transfer function of the coherent transfer function shown in FIG. 12, shown generally in the $k_Yk_Z$ plane.

In the following sections, corresponding to FIG. 12 through FIG. 25, the physical reasons behind the shapes of the objects in FIG. 7 through FIG. 12 will be discussed in more detail. A quasi-monochromatic light field, such as that emitted by a fluorescent microscopy sample, has effectively a single wavelength $\lambda_{emission}$ and, therefore all of its spatial frequency components are confined to a thin shell in Fourier space, of radius $R=1/\lambda$, as is shown graphically in FIG. 12. The field amplitude contains information only about those spatial frequency components of the sample emission amplitude (and phase) which fall within the same thin shell shown in FIG. 12. This shell can be regarded as a coherent transfer function between the sample emission and the electric field. For an incoherent emitting (e.g. fluorescent) sample, however, the average intensity of the light field contains information about the emission intensity, and the relevant "incoherent" transfer function can be obtained by the autocorrelation function of the coherent transfer function. The autocorrelation function of the shell shown in FIG. 12 is nonzero within a sphere of radius $R=2/\lambda$, as shown in FIG. 13.

Figure 14:
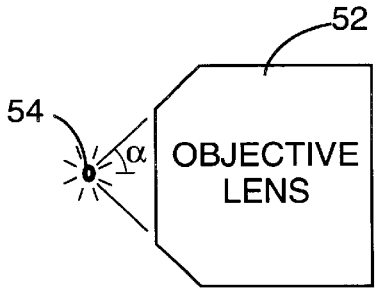
FIG. 14 is a simplified representation of a conventional objective lens with acceptance angle $\alpha$.
Figure 15:
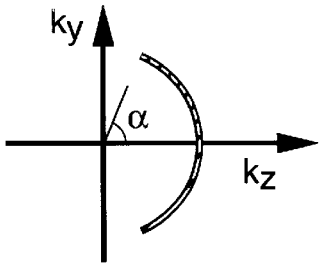
FIG. 15 is a graphic representation of the portion of the coherent transfer function shown in FIG. 12 which is obtained by the conventional objective leans shown in FIG. 14.
Figure 16:
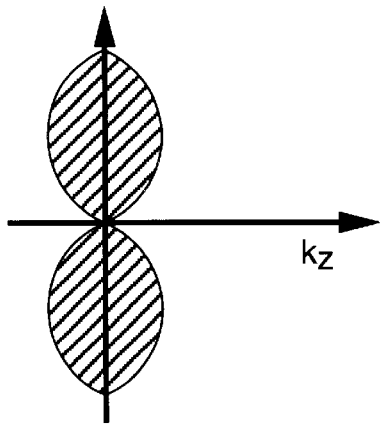
FIG. 16 is a graphic representation of the portion of the incoherent transfer function shown in FIG. 13 which is obtained by the conventional objective lens shown in FIG. 14.
Figure 17:
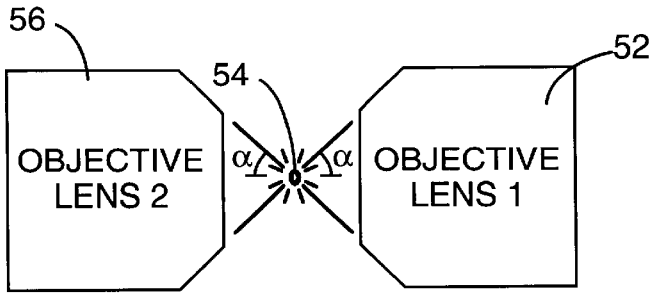
FIG. 17 is a simplified representation of two opposing objective lenses in accordance with the present invention, with each objective lens having an acceptance angle $\alpha$.
Figure 18:
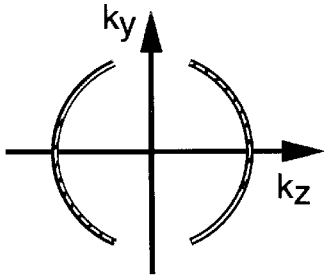
FIG. 18 is a graphic representation of the portion of the coherent transfer function shown in FIG. 12 which is obtained by the dual objective lens arrangement shown in FIG. 17.
Figure 19:
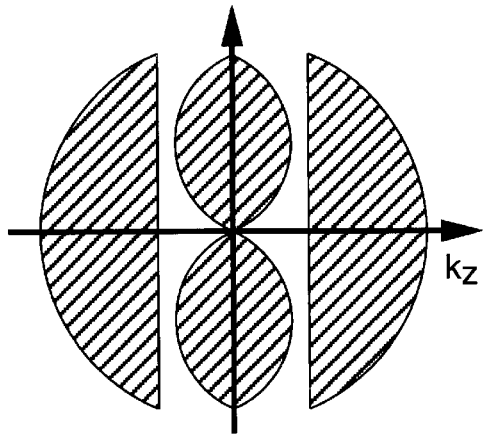
FIG. 19 is a graphic representation of the portion of the incoherent transfer function shown in FIG. 13 which is obtained by the dual objective lens arrangement shown in FIG. 17.

However, as shown in FIG. 14, a conventional objective lens 52 can only access the light from a sample 54 within a certain angle $\alpha$ of its optical axis. The effect is to truncate the coherent transfer function shown in FIG. 12 to a spherical cap-shaped function contained within a cone of half angle $\alpha$ as shown in FIG. 15. The corresponding incoherent transfer function, which is the autocorrelation function of the spherical cap-shaped function of FIG. 15, is shown by FIG. 16. The incoherent transfer function thus is nonzero only within the donut-shaped region of Fourier space shown in FIG. 16, and no information about the sample is available from outside of this region. This donut-shaped region represents the fundamental resolution limits of the microscope, regardless of the optical quality of the lenses used. That this is indeed the main limitation on resolution of three dimensional optical microscopy is clear from the similarity of theoretical predictions to experimental results. In microscopy employing the $I^2M$ embodiment of the present invention, two objective lenses 52, 56 are present, as shown in FIG. 17, so that light within two cones of half angle $\alpha$ can be accessed. This provides a coherent transfer function consisting of two spherical caps, as shown in FIG. 18. The corresponding incoherent transfer, which is the autocorrelation function of the function depicted in FIG. 18, is shown in FIG. 19. The significantly increased width (in the $k_Z$ direction) in FIG. 19 as compared to FIG. 16 is directly related to the increased Z-resolution obtained in the present invention. The graphic representations shown in FIG. 7 through FIG. 19 are shown for an angle $\alpha$ of 67 degrees, corresponding to the most high-resolving objective lenses currently available. For such lenses, the $I^2M$ embodiment will generally improve Z direction resolution by a factor of 3.2 over the background art.

The ability of the $I^3M$ and $I^5M$ embodiments to access information outside the regions depicted in FIG. 16 and FIG. 19 can be understood in terms of a distinction between on the one hand the spatial structure of the light emission and, on the other hand, the spatial structure of the sample itself. The above description of the $I^2M$ embodiment of the invention relates information one can access about observed or emitted light from a sample, which will hereinafter be referred to as E(r). Of more interest, however, is the sample itself or, more specifically, in the context of fluorescence microscopy, the distribution F(r) of fluorescent molecular groups (fluorophores) within the sample. E(r) is related to F(r) by $$E(r)=F(r)I(r)$$

where I(r) is the local illumination intensity or pattern. If the illumination is uniform, as is typically the case in widefield microscopies, then I(r) is constant, so that E(r) and F(r) are identical except for an uninteresting constant scale factor. Thus, the limitations to E related above for the $I^2M$ embodiment apply to F exactly as they do to E.

If, as in the case in the $I^3M$ and $I^5M$ embodiments of the present invention, the illumination is not uniform, the situation is different. The real space product in the equation E(r)=F(r)I(r) corresponds to a convolution in Fourier space. If I(r) has Fourier components outside of the origin (which occurs when I(r) is non-uniform), this convolution operation "moves" sample information to new positions in Fourier space. In particular, it moves some information into the observable region of E from the normally unobservable region. This is the essence of the physical basis for the resolution enhancements of $I^3M$ and $I^5M$ embodiments of the invention. However, as related above, all three embodiments employ essentially the same apparatus, and merely have a different physical basis for the Z direction resolution enhancement.

If the non-uniform illumination pattern were to remain fixed relative to the sample as the data acquisition progressed from section to section, there would be no way to tell the sample fluorescence information F(r) apart from the illumination pattern I(r). In other words, the illumination pattern would look like part of the sample. This would result in the acquired data remaining restricted to the usual (small) observable region of Fourier space shown in FIG. 7, but the information which belonged to other areas of the sample would get mixed in with it. This mixed-together data [Would] *would* in general be difficult to separate. If, on the other hand, the illumination pattern stays fixed in relation to the focal plane, it will "look like part of the point spread function," in which case the acquired data stays in its correct position in Fourier space, and instead the optical transfer function itself becomes extended. This latter, clearly preferable state of affairs is the case for the present invention as described herein.

It is possible to change the relative strength of the different parts of the optical transfer functions by apodization, e.g., by introducing masks, in planes conjugate to the back focal planes of the objective lenses, into the imaging beams, illumination beams, or both. Use of polarizing components to restrict the illumination light, the imaging light, or both, to a single polarization state, may also be employed. In the case of both, these states can be the same or different.

Interference microscopies generally employ light sources with high temporal and spatial coherence, and typically require use of lasers. One might ask how it can be possible to achieve interference with "incoherent" light. The standard way of analyzing this involves consideration of individual point sources of an incoherent light source. In a spatially "incoherent" light source, such as a thermally glowing light bulb filament, light "rays" emitted from different points have a randomly varying relative phase, that is to say they are mutually incoherent. Each source point by itself, however, can be considered a coherent light source, since a point source cannot have a phase difference relative to itself. The total effect of the entire light source can therefore be found by first considering each individual source point by itself, then calculating the light intensity caused by that point alone (which, since each point is coherent, will provide a bona fide interference pattern), followed by adding all of all these intensities. In most situations, such as when using a standard desk lamp, the various interference patterns cancel each other out and add up to a smooth intensity distribution. The particular geometry employed in the present invention, however, is designed so that every source point interference pattern has a peak at the focal plane, and therefore their sum, the total intensity distribution, also has such a peak.

Figure 20:
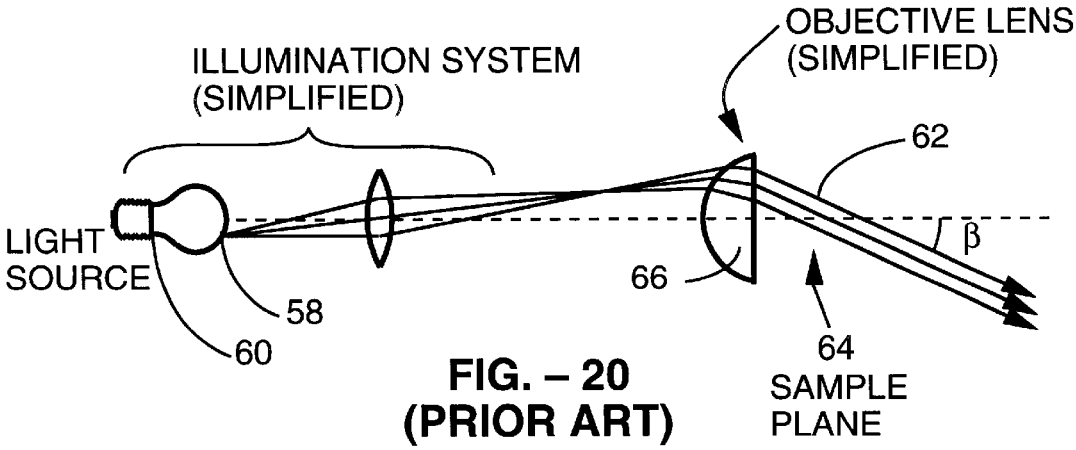
FIG. – 20 (PRIOR ART)
FIG. 20 is a simplified diagrammatic representation of the illumination arrangement generally used in a conventional microscopy system employing a single objective lens, showing light from a single point of light source.
Figure 21:
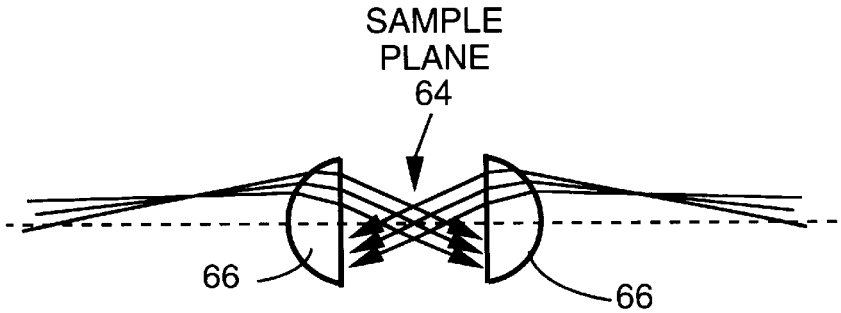
FIG. 21 is a simplified diagrammatic representation of the illumination arrangement used in the $I^3M$ and $I^5M$ embodiments of the present invention, showing light from a single point of the illumination source illuminating the sample from both directions after having been split into two beams by the beam splitting means.
Figure 22:
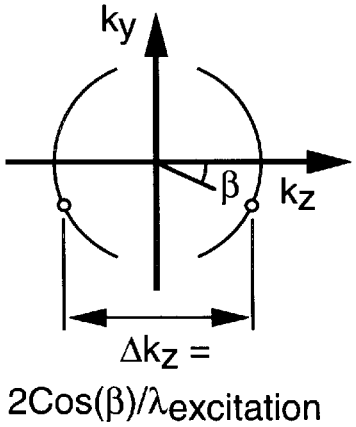
FIG. 22 is a graphic depiction of the Fourier space representation corresponding to illumination or excitation light amplitude from the point source illumination arrangement shown in FIG. 21, viewed generally in the $k_Yk_Z$ plane.
Figure 23:
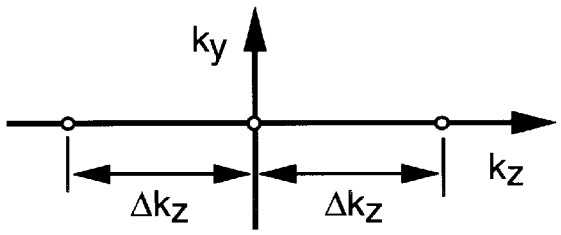
FIG. 23 is a graphic representation of the autocorrelation function of the Fourier space representation shown in FIG. 22 corresponding to the intensity of the illumination light in the point source illumination situation shown in FIG. 21.
Figure 24:
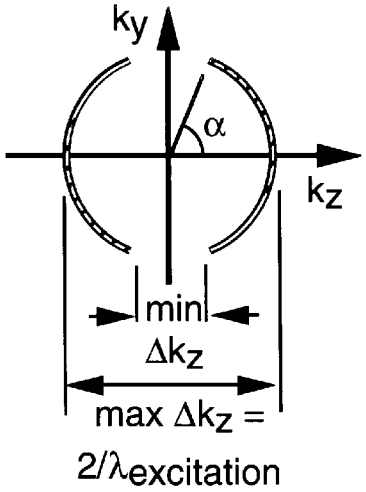
FIG. 24 is a graphic depiction of the union, over all points of the illumination source, of the regions (point pairs) depicted by FIG. 22.
Figure 25:
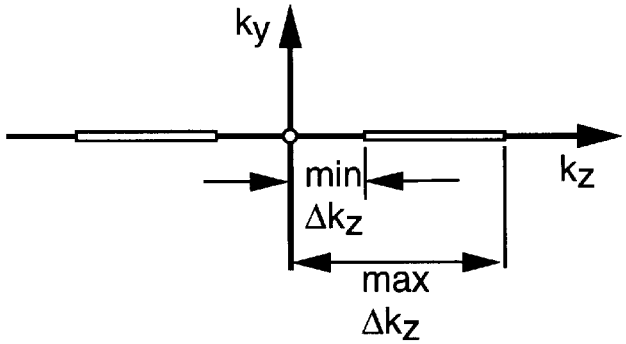
FIG. 25 is a graphic representation of the union, over all points of the illumination source, of the regions (point triplets) depicted by FIG. 23.

Referring to FIG. 20, the illumination arrangement generally employed in standard microscopies is called Köhler illumination, wherein the light from each source point 58 of an illuminating source 60 is focused into a parallel beam 62 in sample space and in sample plane 64 by lens 66, at an angle β that differs from source point to source point. In the $I^3M$ and $I^5M$ embodiments of the present invention, however, the light from each source point is split by a beam splitter and instead corresponds to two beams in sample space, as shown in FIG. 21. In Fourier space this corresponds to two points on the sphere of radius $1/\lambda_{excitation}$ as is shown graphically in FIG. 22. The resulting intensity (from the particular source point under consideration) is the autocorrelation function of these two points as shown by the three points in FIG. 23, which in real space corresponds to a sinusoidal interference pattern aligned with the Z-axis. The total light intensity in the sample is the sum of the intensity contributions from all the points of the light source. The set of possible light beams that can be transmitted by the objective lenses is described in Fourier space by the double spherical cap shown in FIG. 24, which is generally the same as was shown in FIG. 18, except that FIG. 24 shows a radius of $1/\lambda_{excitation}$ instead of $1/\lambda_{emission}$ as in FIG. 18. Each point on the light source will give rise to some particular angle β (as defined in FIG. 21 and FIG. 22), and thus to a particular value of $\Delta k_Z$, which is given by$=2COS(\beta)/\lambda_{excitation}$. With full aperture illumination, every such ray, and thus every such value of β, is generated by some point on the light source. Thus β takes on all values from $-\alpha$ to α, so $\Delta k_Z$ takes on all values from $\Delta k_{Zmin}=2Cos(\alpha)/\lambda_{excitation}$ to $\Delta k_{Zmax}=2/\lambda_{excitation}$. The total illumination intensity, the sum of all the contributions from all the points on the light source, is thus represented in Fourier space by the union of the regions of FIG. 23 for all values of $\Delta k_Z$ between $\Delta k_{Zmin}$ and $\Delta k_{Zmax}$. The resulting region is shown in FIG. 25. This region, which can be recognized by comparison to FIG. 9, is the region of support of the Fourier transform of the total illumination light intensity in the sample. The region can be thought of as a version of FIG. 19 with everything outside of the $k_Z$ axis discarded.

For illustration purposes only, by way of example and not of exclusion. FIG. 26 through FIG. 29 show possible embodiments of the present invention. Referring first to FIG. 26, there is shown a schematic diagram of an apparatus 68 for use with the $I^2M$ embodiment of the invention. All components of apparatus 68 are mounted on supporting means, such as a platform or housing (not shown), which preferably is vibrationally isolated. First and second objective lenses 70, 72 may include translation adjustment means, although generally, second objective lens 72 alone is mounted on translational adjustment means, shown here as translation stages 74, which can undergo XYZ positioned adjustment by actuating screws 76, which are oriented in the X, Y, and Z directions. Second objective lens 72 is mounted to translation stages 74 by angular adjustment means, such as a tiltable mount 78, containing actuating means such as adjustment screws 80. First objective lens 70 is preferably mounted directly to support member 82. Objective lenses 70, 72 must generally be carefully aligned in position and angle for interference to take place. Such precision adjustment is allowed by adjusting translation stage 74 positionally on the supporting means. Illuminating light from illuminating means, such as light from a filtered mercury arc lamp (not shown) directed through an optical fiber 84, is focused and directed through illumination [focussing] *focusing* means, shown here as lenses 86, 88, 90, *and optional beam delimiting means, shown here as field stop 87 and aperture stop 89,* onto beam splitter 92. Optical fiber 84 preferably has a wide core (1 mm), so as to act as a spatially incoherent light source. Beam splitter 92 reflects illuminating light through first objective lens 70 and onto a sample 94. Sample 94 is mounted by support 96 to translational adjustment means, shown here as translation stage 98, which is translated by screws 100. Observed light, or, in the case of fluorescence microscopy, emission light from the sample, emerges through both first and second objective lenses 70, 72, and is selectively transmitted by beam splitter 92 and optional second beam splitter 102. Said beam splitters 90, 102 may be dichroic, and will be referred to herein as dichroic mirrors 92, 102 for simplicity. Light transmitted by dichroic mirror 92 traverses mirrors 104, 106 along path 108, while light transmitted by dichroic mirror 102 traverses mirrors 110, 112 along path 114. The light directed along paths 108 and 114 is directed to and combined into a single beam 118 by beam splitting and recombining means, preferably in the form of beam splitter cube 116. Beam splitter cube 116 is preferably mounted on a translating and tilting stage 120 which is moved by screws 122. The light in beam 118 passes through filter 124 to remove illuminating light, and finally may be focused by [focussing] *focusing* means, shown here as achromatic lens 126, onto image detection means 128, preferably in the form of a CCD camera or the like. Lens 126 preferably includes a focusing stage 130 which is positionally adjusted by screw 132. Image detection means 128 is generally interfaced to data processing means (not shown), wherein data sets from samples may be stored for computational deconvolution. For alignment purposes, the beam can be deflected by a removable mirror 134 into an eyepiece 136 and/or other alignment aides (not shown) which may be mounted on kinematic base plates (not shown) so they can be swapped and replaced with precision. The path length difference between paths 108, 114 can be adjusted and fine tuned to within the coherence length of the observed and illuminating light through positional adjustment of "phasing" translation stage 138, to which mirrors 104, 106 are mounted by angle adjustment means, such as [tillable] *tiltable* mirror mounts 140, 142, with actuating means such as screws 144. Translating stage 138 is positionally adjusted by screw 146, and will lengthen or shorten path length 108 relative to path 114. Fine adjustment of the phase can be done by precision motion of stage 138 as well as off-line in software after the data are acquired. The interference pattern on image detection means 128 can be monitored using a pinhole-apertured photo diode (not shown) where eyepiece 136 is shown.

All optical surfaces used with the present invention, including beam splitter/recombiner cube 116, should preferably be of high optical flatness, preferably λ/20 or better, to preserve the relative phase of different rays. Since the Z-direction resolution is increased by the present invention, the sample has to be moved with increased precision relative to current state of the art microscopes. This is ensured by use of a piezoelectric actuator 148 on the sample translating stage 98, which is responsive to feedback control from capacitive sensor 150 which measures the actual sample position. Similar position sensors and actuators may also be employed to sense and correct the position of second objective lens 72 and/or of phase adjusting stage 138.

Since fluorescence emission typically occurs over a fairly wide range of wavelengths (~50 nm), and restriction of the bandwidth with narrow filters is undesirable as light would be discarded unnecessarily, care should be taken to ensure that the equality of the two optical path lengths holds true (within tolerances) for all wavelengths in this band. A potential problem is the dispersion (dependence of refractive index on wavelength) of optical materials. Thus, when the $I^2M$ embodiment is used for fluorescence microscopy, one should assure that all components through which the light is transmitted (i.e. the lenses, the dichroic mirrors, and the two halves of the beam splitter cube) are of identical optical thickness in the two beams or paths 108, 114, to within sufficiently tight tolerances. An alternative approach to dispersion problems is to include, if necessary, compensating plates 152, 154, which can be tilted to change their effective thickness, or one of which consists of two thinner plates separated by index matching fluid, so that its total thickness can be adjusted, or one of which consists of two wedges that can be moved past each other so as to form a single plate of variable thickness. The same potential dispersion problem applies to wavelength differences within the illuminating light in the $I^3M$ and $I^5M$ embodiments, and to the wavelength difference between the illuminating light and the observed light in the $I^5M$ embodiment when used for fluorescence. Chromatic phase compensation means such as compensating plates 152, 154 may be used to address this problem in all three embodiments.

Referring now to FIG. 27 an alternative apparatus 156 consistent with the $I^2M$ embodiment of the present invention is generally shown, wherein like reference numerals denote like parts. The apparatus 156 is slightly more compact, which is achieved simply by replacing mirrors 104, 110 as shown in FIG. 26 with dichroic mirrors 158, 160, so that illuminating light can aimed directly at sample 96 through dichroic mirror 158, which transmits the illumination or excitation light but reflects the emission light, instead of vice versa. Apparatus 156 is more compact, but somewhat less symmetric: since the two dichroic mirrors 158, 160 are used at different angles, they can no longer both be identical and at the same time have identical phase and spectral effects on their respective beams.

The $I^2M$ embodiment described above in FIG. 26 and FIG. 27 can be turned into an $I^3M$ system simply by exchanging the positions of the illuminating light from [fibre] *fiber* optic 84 with that of image detection means 128 and focusing lens 126. This is readily apparent by referring to FIG. 28, wherein like reference numerals denote like parts. Thus, FIG. 28 shows an apparatus 162 wherein illuminating or excitation light from optical fiber 84 is split by beam splitter/recombiner 116 and directed along paths 108, 114 to first and second objective lenses 70, 72 respectively, which then focus the illuminating light onto a plane of sample 96. As related above, the $I^3M$ embodiment records observed light from only one objective lens. This is carried out by placing beam splitter 158, which may be dichroic, between image detection means 128 and first objective lens 70, so that emitted or observed light is selectively transmitted through dichroic mirror 158 to image detection means 128. Otherwise, the apparatus 162 is generally the same as the apparatus shown in FIG. 26 and FIG. 27 for the $I^2M$ embodiment of the present invention, and is operated in generally the same manner, as will be more clearly described below.

Referring now to FIG. 29, an apparatus 164 consistent with the $I^5M$ embodiment of the present invention is generally shown. As related above, the $I^5M$ embodiment is a combination of the $I^2M$ and $I^3M$ embodiments, and thus both records observed or emitted light from both objective lenses 70, 72 as in the $I^2M$ embodiment and illuminates the sample from both objective lenses 70, 72 as in the $I^3M$ embodiment. This is readily apparent by comparing FIG. 26 through FIG. 29. In the apparatus 164 shown in FIG. [9] *29*, illuminating or excitation light from optical fiber 84 is split by beam splitter/recombiner 116 and directed along paths 108, 114 to first and second objective lenses 70, 72 respectively, where the illuminating light is focused on a section of sample. Observed or emitted light collected by first and second objective lenses 70, 72 is directed back along paths 108, 114 respectively and combined by beam splitter/recombiner 116 and focused onto image detection means 128. Thus, once the general apparatus for the present invention is aligned for operation of the $I^2M$ embodiment, it is then automatically aligned for $I^5M$ embodiment as well, except for one detail: the relative phase of the two illumination beams is the opposite of the ideal one, so that the illumination intensity gets a minimum instead of a maximum at the focal plane. It is possible to use the apparatus 164 in this state, but it decreases the signal-to-noise ratio. This problem is caused by the phase shift upon reflection in the beam splitter, which is an unavoidable result of energy conservation. There are, however, several ways around the problem. For example, a separate beam-splitting loop for the illumination light can be employed as shown generally in FIG. 5. Such a configuration would allow the phase of the illumination light to be adjusted independently of the phase of the observed light, using a second, independent optical path length adjusting means. Alternatively, one can make the illumination light incident on the beam splitter cube from the same side from which the emission light is detected, as shown generally in FIG. 6. This approach also requires an additional beam splitter/recombiner, which may be dichroic. Yet another approach is to exploit the wavelength difference between the illuminating or excitation light and the observed or emitted light, to create a compensating phase difference between them by slightly offsetting the chromatic phase compensation plates 152, 154. Such an offset however, is made at the expense of getting some phase variation within the excitation and emission bands themselves. The apparatus used in $I^5M$ embodiment of the present invention may allow illumination light to be introduced through either side of the beam splitter cube 116, so as to be able to acquire data at both phase conditions.

Figure 30:
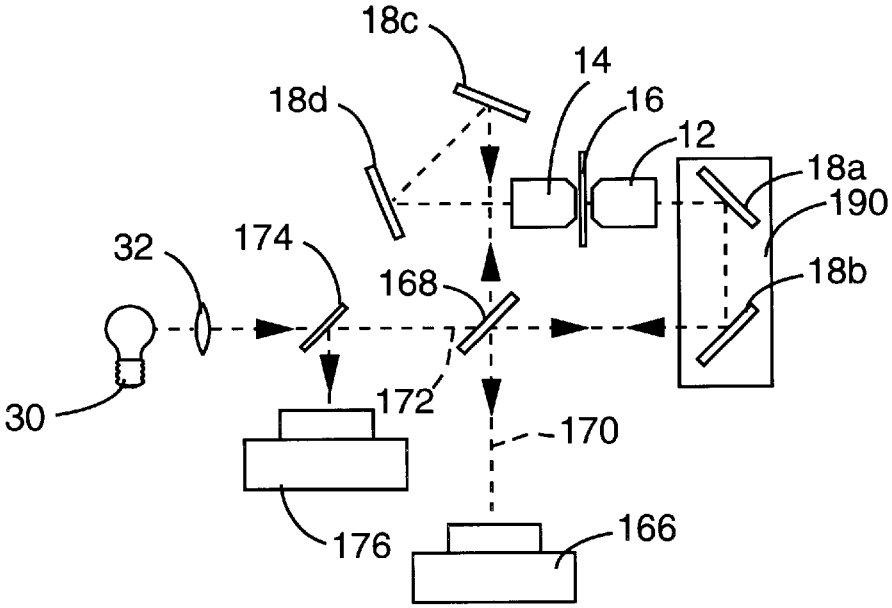
FIG. 30 is a plan view of the $I^5M$ embodiment of the present invention in which two image recording devices are employed.
Figure 31:
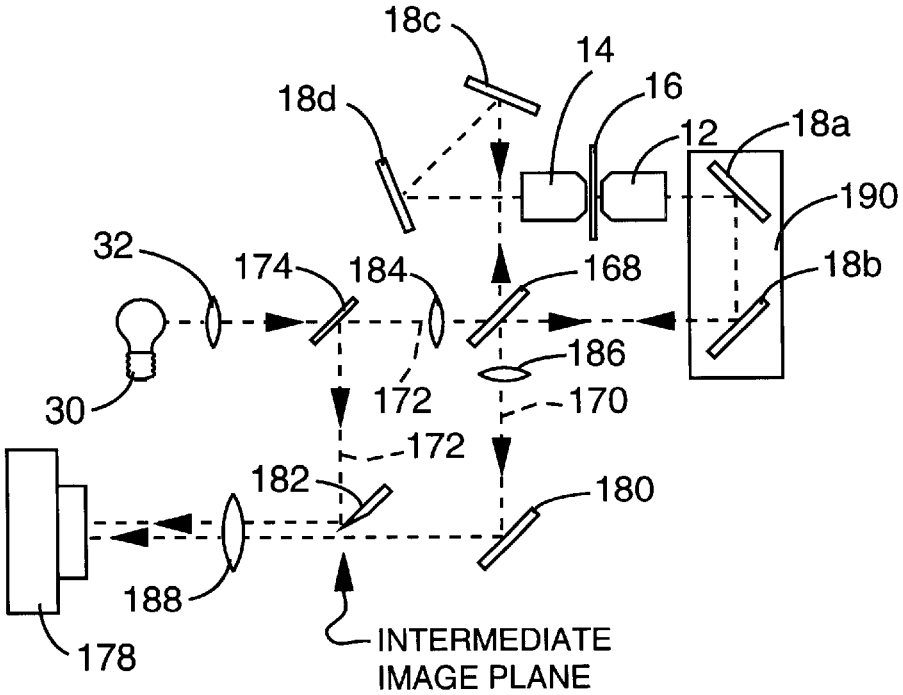
FIG. 31 is a plan view of the $I^5M$ embodiment of the present invention wherein different portions of the same image detector are employed.

As related above, the phases of the two beam paths 108, 114 for each embodiment shown in FIG. 26 through FIG. 29 must generally be adjusted to be equal, which may be carried out using phase adjusting stage 138. Phase measurements to determine the amount of adjustment required are easily done using test samples such as fluorescent microbeads. A more practical method for commercial application of the present invention, however, would involve dual detection, wherein both of the two beams of emission light that emerge from the beam splitter are detected and recorded, as in generally shown in FIG. 30 and FIG. 31. In FIG. 30, image detection means 166 records light from one side of beam splitter/recombiner 168, which is directed to image detection means 166 along path 170. Light from the other side of beam splitter/recombiner 168 along path 172 is reflected off dichroic mirror 174 to image detection means 176. In FIG. 31, the same general effect is obtained by directing the light from beam splitter/recombiner 168 along path 170 to one portion of image detection means 178 via mirror 180, and directing light from beam splitter/recombiner along path 172 to another portion of image detection means 178 via dichroic mirror 174 and truncated mirror 182. Lenses 184, 186, 188 focus light on paths 170, 172 to separate portions of the detector on image detection means 178. Dual detection results in the positive side effect of using the emitted light even more efficiently. The two beams exiting the beam splitter/recombiner 168 represent different combinations of the two incoming beams, differing by a phase shift of 180 degrees. By detecting both beams, either on separate cameras 166, 176, as shown in FIG. 30 or on different parts of the same camera 178, as shown in FIG. 31, and comparing the two data sets in Fourier space, one can deduce the phase angles of both the emission and the illumination light paths, and thereby adjust the phase adjusting stage 190 and the chromatic phase compensator plates (not shown) if such are used. This could easily be done automatically.

One may want to acquire multiple data sets with different relative phase, of the imaging beams, illumination beams, or both. In particular, using the $I^3M$ or $I^5M$ embodiments of the present invention, one data set could be acquired with the illumination phase adjusted so as to have constructive interference at the focal plane, and also a second data set with the opposite illumination phase, where the illumination intensity would then have a minimum at the focal plane. Using the difference between these two data sets, the interferometric information components could be enhanced and the background suppressed.

While the $I^3M$ and $I^5M$ embodiments of the present invention have been described generally in the context of using Köhler illumination, several other illumination arrangements are suitable for use with these embodiments. For example, critical illumination will give similar results to Köhler illumination, as will any intermediate arrangement.

The present invention generally requires that the first and second objective lenses are focused on the same point in the X, Y and Z directions. This can be done by taking two three-dimensional test data sets (which may be smaller than an actual data set, for increased speed), one data set using the first objective lens only, (e.g. by closing a shutter in the beam path from [that lens] *the second lens*), and one data set with the second objective lens only (by similarly blocking the path from the [other] *first* lens during data recording). A simple cross-correlation procedure then would determine the focus and lateral offset errors, which can be corrected by moving one of the objective lenses relative to the other lens. This procedure can be done automatically, and applies to the $I^2M$ and $I^5M$ embodiments, with or without dual detection.

Figure 32:
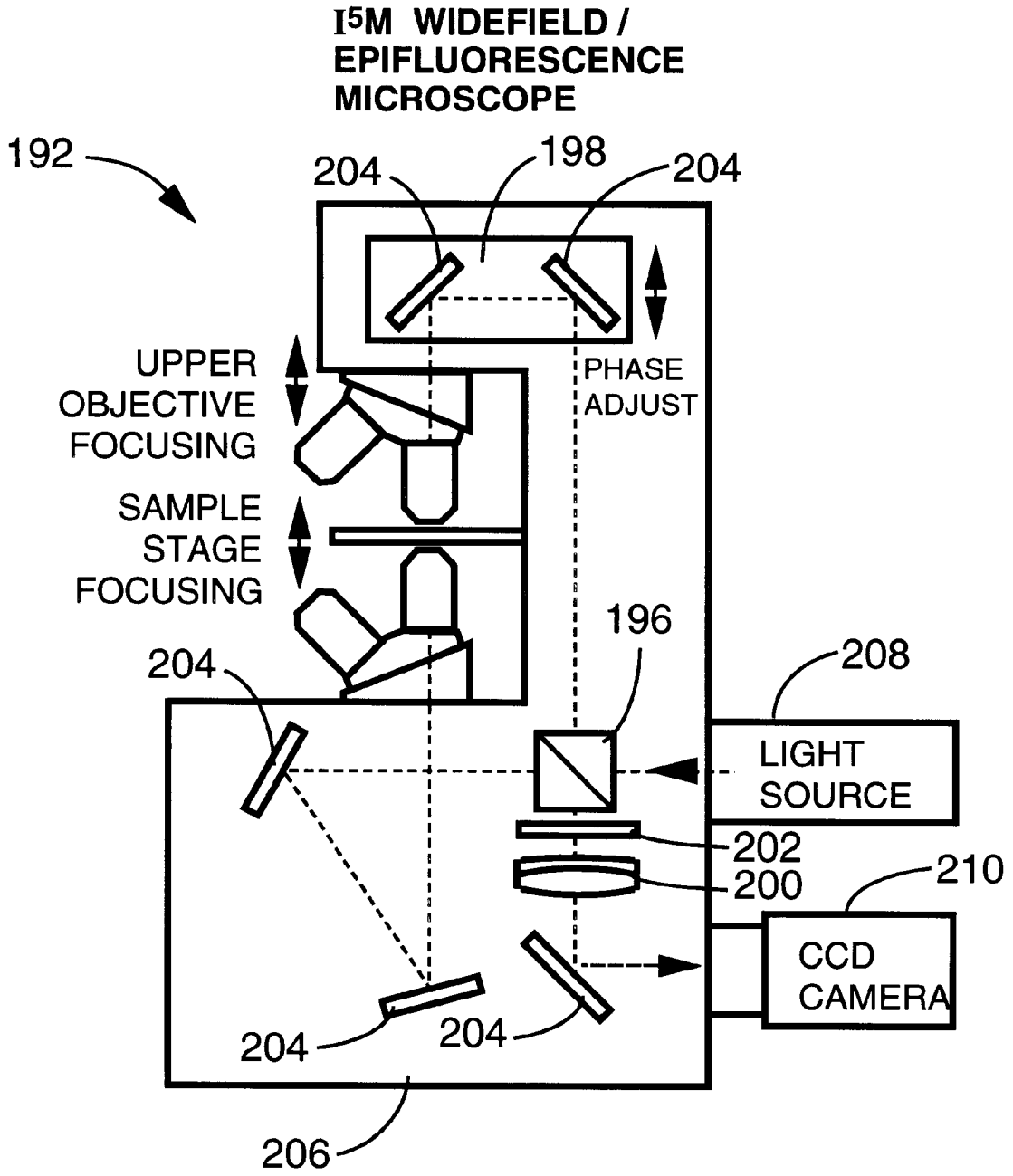
FIG. 32 is a simplified schematic representation of the present invention incorporated into a standard inverted microscope equipped for epi-illumination.
Figure 33:
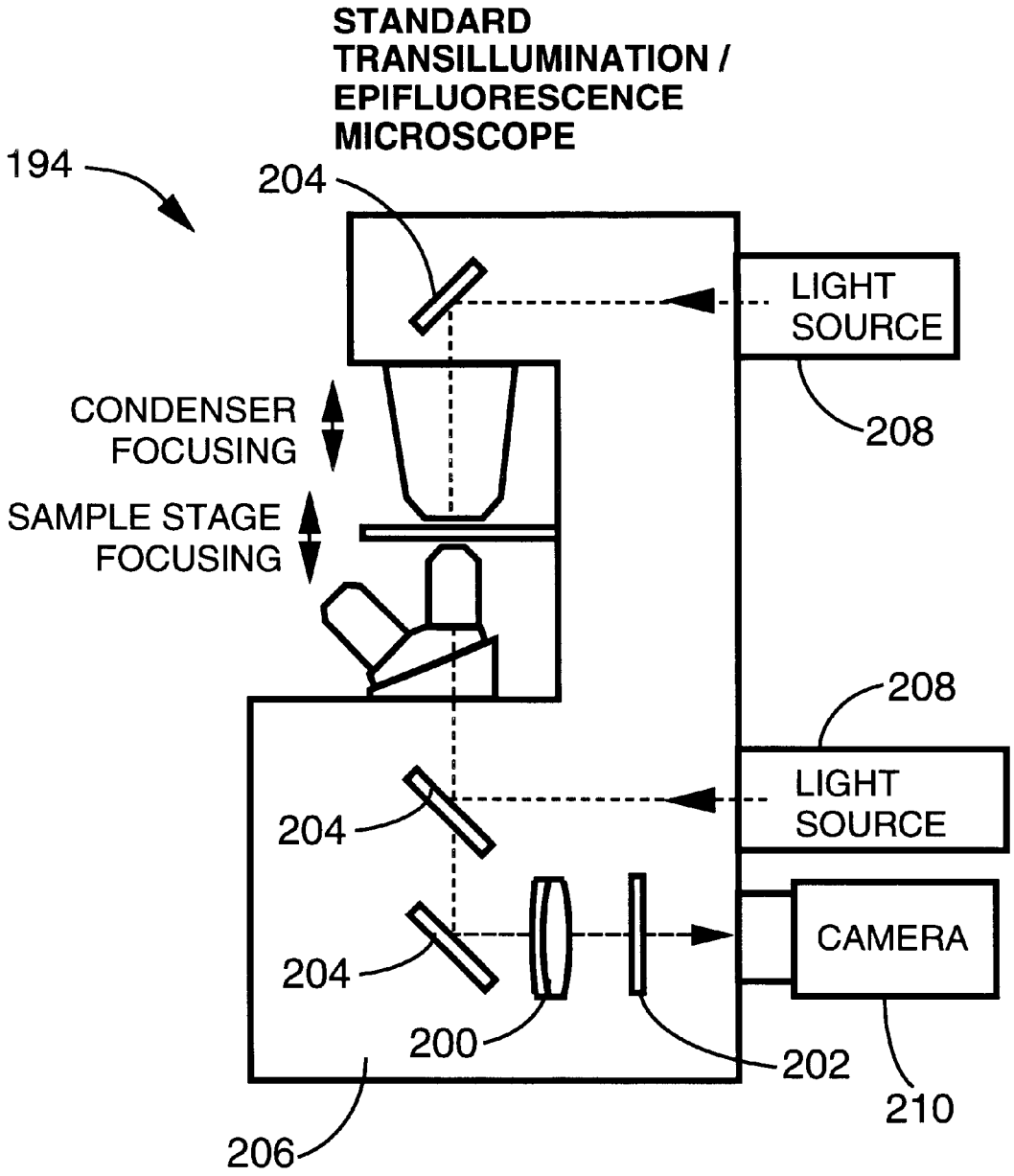
FIG. 33 is a simplified schematic representation of a standard inverted microscope equipped for both epi- *and* trans-illumination.

Referring now to FIG. 32 and FIG. 33, commercial implementations of the present invention as microscope 192 in FIG. 32 may look more like a typical microscope depicted schematically in FIG. 33 than the previous schematics may indicate. For example, as shown in FIG. 32, beam splitter/recombiner 196, phase adjusting stage 198, lens 200, filter 202, and mirrors 204 as well as other components (not shown) can be incorporated into a structure 206 similar to existing commercial microscopes, with light source 208 and image detection means 210 suitably positioned for the embodiment or embodiments of invention to be used.

Figure 34:
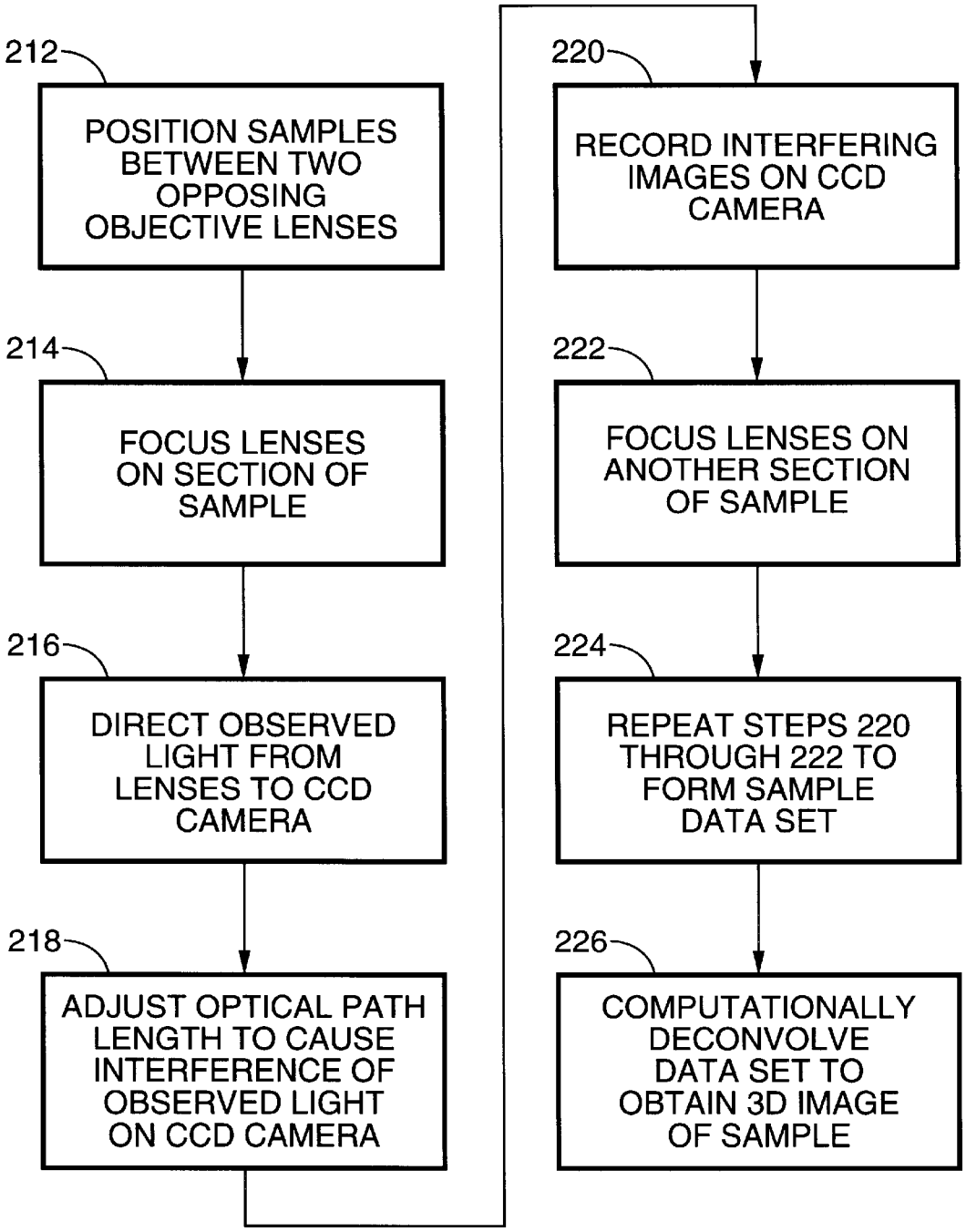
FIG. 34 is a flow diagram showing the general steps of the method for using the $I^2M$ embodiment of the present invention.
Figure 35:
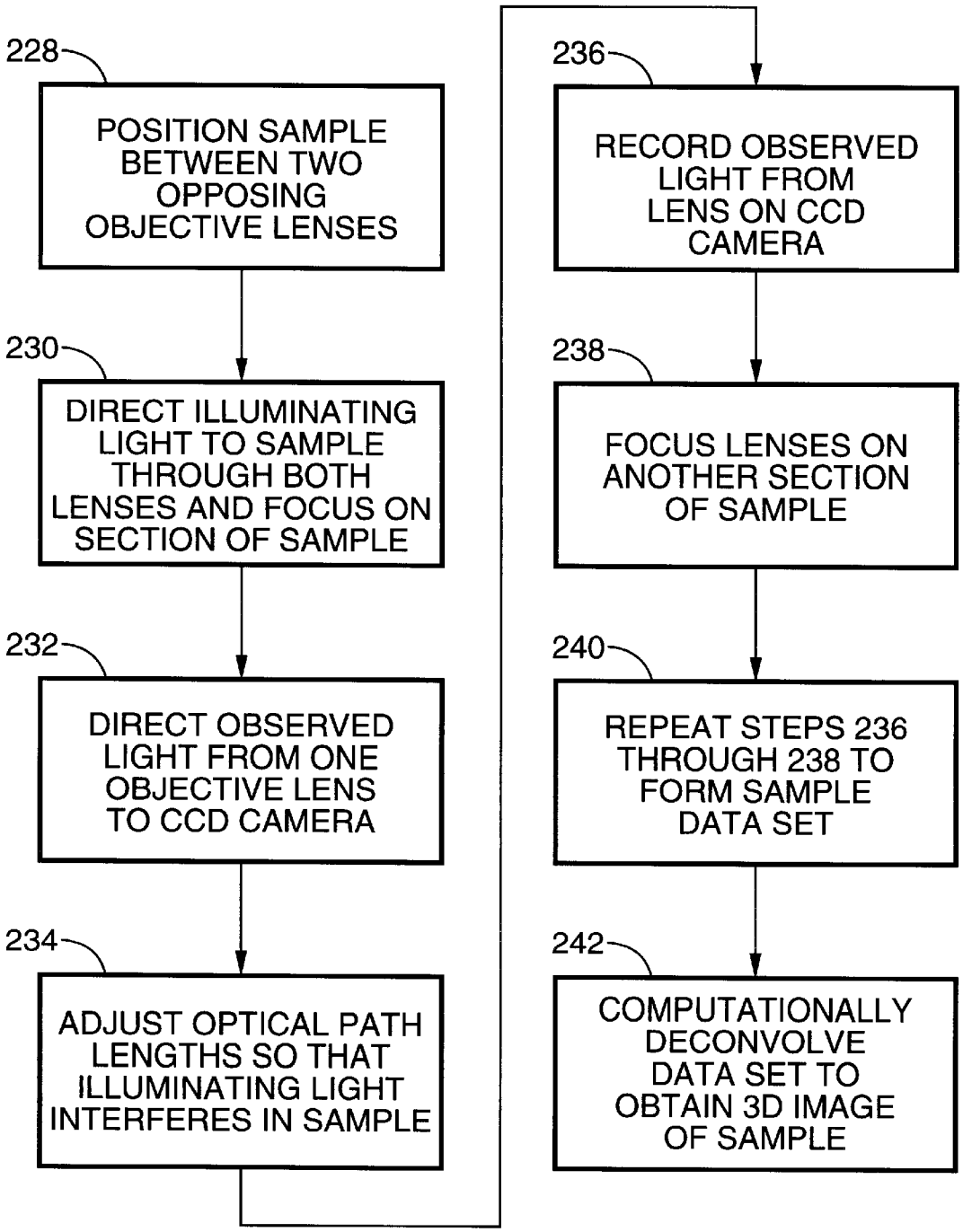
FIG. 35 is a flow diagram showing the general steps of the method for using the $I^3M$ embodiment of the present invention.
Figure 36:
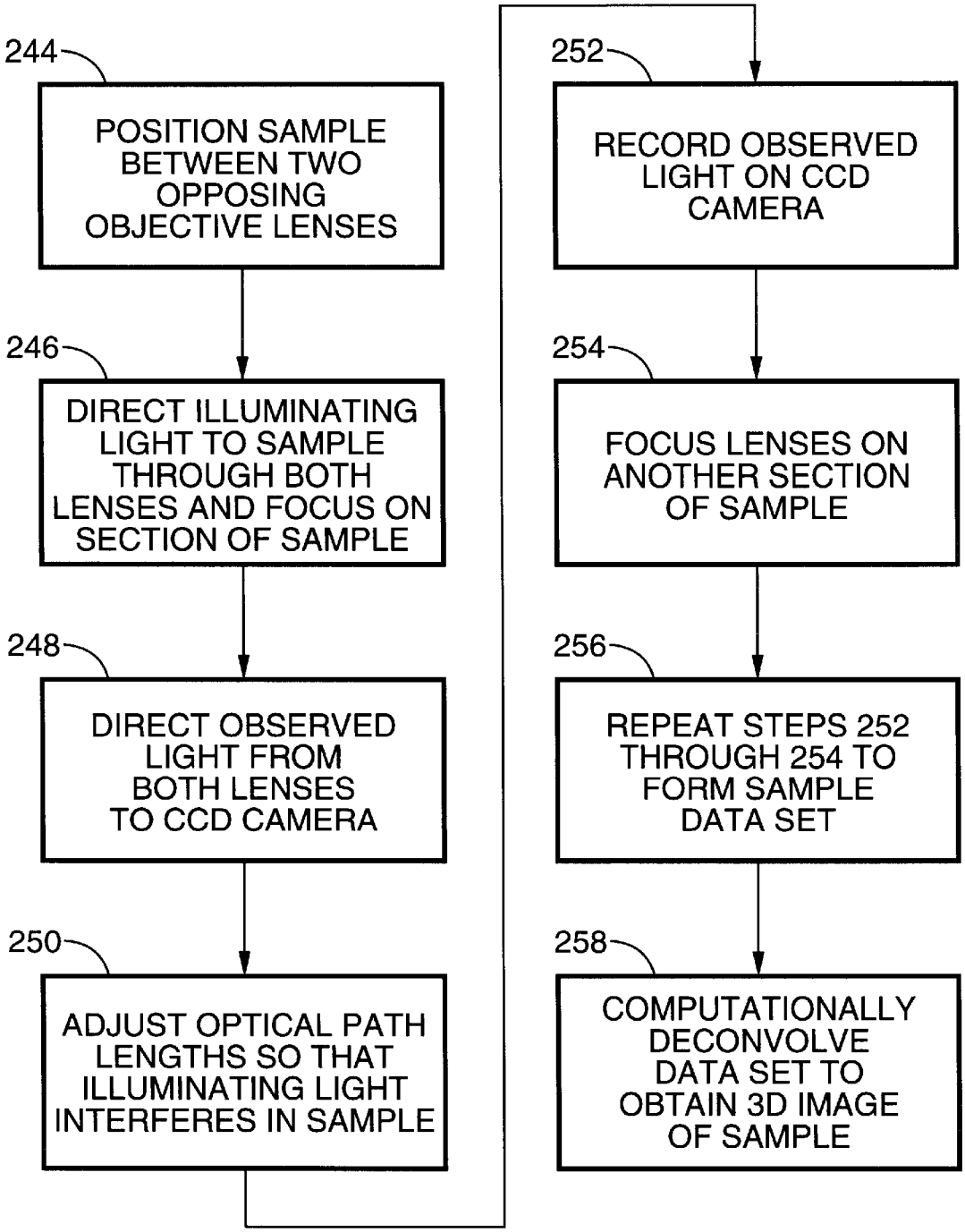
FIG. 36 is a flow diagram showing the general steps of the method for using the $I^5M$ embodiment of the present invention.

Referring now to FIG. 34, FIG. 35, and FIG. 36, flow charts relating the method of employing each embodiment of the present invention are generally shown. Referring first to FIG. 34, a flow diagram for the $I^2M$ embodiment of the present invention is generally shown. At step 212, a microscope sample is positioned between first and second opposing objective lenses. As related above, the microscope sample is preferably mounted between glass cover slides. For fluorescent microscopy, the sample will be suitably labeled by selected fluorescent probes.

At step 214, the two opposing objective lenses are focused upon a section or plane within the sample. Focusing is preferably carried out by moving one or both objective lenses, or the sample, on precision translating means such as translating stages.

At step 216, the light or image observed by first and second objective lenses is directed along first and second paths to image detection means such as a CCD camera or the like for image recording, whereupon the observed light from the two paths is caused to coincide. This step is generally carried out by a plurality of mirrors that direct light along first and second paths to a beam splitter/recombiner which combines the light from the two paths and directs it to the image detection means.

At step 218, the optical path lengths of the first and second paths are adjusted so that the two path lengths differ by less than the coherence length, and preferably much less than a wavelength, thereby causing the coinciding observed light on the image detection means in step 216 to interfere on the image detection means. Optical path length adjustment is generally carried out by a translating stage with mirrors mounted thereon.

At step 220, the interfering observed light or images in step 218 are recorded by the image detection means. The image detection means is preferably interfaced to data processing means such as a microprocessor, allowing the recorded image to be stored.

At step 222, the first and second objective lenses are focused on another section of the sample. This step is preferably carried out by translating the sample relative to the objective lenses, translating the objective lenses, or translation of sample and lenses.

At step 224, steps 220 through 222, or optionally steps 218 through 222, are repeated, until each section of the sample has been observed and recorded as related above. The recorded images from each section of sample form a data set for the entire sample, which is stored by the microprocessor interfaced to the image detection means.

At step 226 means for computational deconvolution are applied to the data set of step 224, to produce a three dimensional image of the sample which has enhanced Z direction resolution. The term "deconvolution" as used herein should be understood to mean any form of reconstruction method or algorithm. The computational deconvolution will generally involve software which may employ a plurality of Fourier transformation algorithms. The image data may also or instead be displayed after simpler processing and prior to a full computational deconvolution, or after none at all. One reason to do this would be to display the data in real time. Even unprocessed, it will still confer more information than in conventional widefield microscopy.

An additional step (not shown), wherein the illuminating light is provided to the sample through one of the objective lenses, may be included between step 212 and 214. While K öhler illumination, as related above, is the preferred illumination technique, other illumination methods generally used in the art are also contemplated.

Another additional step (not shown), wherein chromatic phase matching of the observed light is carried out, may also be included prior to step 220. Phase matching is preferably carried out with phase compensator plates, one of which comprises two wedges of which one can be translated past the other in order to vary the optical thickness of the combination.

Yet another additional step (not shown) may be included prior to step 220 in which the observed light from first and second objective lenses is focused onto the image detection means. This focusing is preferably carried out by one or more translatable lenses.

Still another additional step (not shown) may be included between steps 212 and 214, wherein the sample is aligned between the first and second objective lenses. The alignment is preferably carried out using an eyepiece which observes the sample by a removable mirror or mirrors.

Referring now to FIG. 35, a flow chart is shown which relates the general steps comprising the method of the $I^3M$ embodiment of the present invention. At step 228, a microscope sample is positioned between first and second opposing objective lenses. As related above for the $I^2M$ embodiment, the microscope sample is preferably mounted between glass cover slides. Since the $I^3M$ embodiment is primarily contemplated for use in fluorescent microscopy, the sample will preferably be suitably labeled by selected fluorescent probes.

At step 230, excitation or other illumination light is directed through first and second objective lenses onto a section of the microscope sample, and focused thereupon. This step is generally carried out by directing illuminating light to a beam splitter/recombiner which splits the light into first and second paths, and then directing the light along first and second paths by a plurality of mirrors to first and second objective lenses respectively. Generally, an extended, spatially incoherent light source is used to provide illuminating light.

At step 232, observed or emitted light from the first objective lens is directed towards an image detection means such as a CCD camera or the like. Generally, a dichroic mirror is used for this step, which selectively transmits observed light while reflecting illuminating light or vice versa.

At step 234, the illumination light directed to the sample is caused to interfere within the section of sample. Causing the interference is generally carried out by adjusting the optical path lengths of first and/or second paths. Generally, optical path length adjustment is achieved by moving a translating stage which includes mirrors mounted thereon.

At step 236, the observed or emitted light which was directed to the image detection means is recorded. The image detection means is preferably interfaced to a microprocessor, as in the $I^2M$ embodiment of the invention, so that a plurality of images may be stored.

At step 238, illuminating or excitation light is directed onto another section of sample and focused thereupon by first and second objective lenses.

At step 240, steps 236 through 238, or optionally steps 234 through 236, are repeated until a data set comprising the recorded images of each section of sample has been obtained and stored.

At step 242, computational deconvolution means are applied to the data set from step 240 to provide a three dimensional image of the sample with enhanced Z direction resolution.

As in the $I^2M$ embodiment, a phase matching step and an alignment step, may be included, as well as a step in which observed light is focused onto the image detection means.

Referring now to FIG. 36, a flow chart is shown which relates the general steps comprising the method of the $I^5M$ embodiment of the present invention. At step 244, a microscope sample is positioned between first and second opposing objective lenses. As related above for the $I^2M$ and $I^3M$ embodiments, the microscope sample is preferably mounted between glass cover slides. As the $I^5M$ embodiment is primarily contemplated for fluorescent microscopy, the sample will preferably be suitably labeled by selected fluorescent probes.

At step 246, excitation or other illumination light is directed through first and second objective lenses onto a section of the microscope sample, and focused thereupon. This step is generally carried out by directing illuminating light to a beam splitter/recombiner which splits the light into first and second paths, and then directing the light along first and second paths by a plurality of mirrors to first and second objective lenses respectively.

At step 248, the light observed or emitted by the sample is directed from first and second objective lenses along the first and second paths to an image detection means such as a CCD camera or the like, whereupon the observed light from first and/or second paths is caused to coincide. The same mirrors and beam splitter/recombiner as was used in step 246 may be employed for directing observed light from the sample to the image detection means. Alternatively, separate beam splitters and additional mirrors may be used, as related above in FIG. 4 through FIG. 6.

At step 250, the illumination light directed to the sample is caused to interfere within the section of sample. Causing the interference is generally carried out by adjusting the optical path lengths of first and second paths. Generally, optical path length adjustment is achieved by moving a translating stage which includes a mirror or mirrors mounted thereon.

At step 252, the observed or emitted light which was directed to and coincided upon the image detection means is recorded by the image detection means. The image detection means is preferably interfaced to a microprocessor, as in the other embodiments of the invention, so that a plurality of images may be stored.

At step 254, illuminating or excitation light is directed onto another section of sample and focused thereupon by first and second objective lenses.

At step 256, steps 252 through 254, or optionally steps 250 to 254 are repeated until a data set comprising the recorded images of each section of sample has been obtained and stored. One may want to acquire multiple data sets with different relative phase, of the imaging beams, illumination beams, or both. In particular, using the $I^3M$ or $I^5M$ embodiments of the present invention, one data set could be acquired with the illumination phase adjusted so as to have constructive interference at the focal plane, and also a second data set with the opposite illumination phase, where the illumination intensity would then have a minimum at the focal plane. Using the difference between these two [dam] *data* sets, the interferometric information components could be enhanced and the background suppressed.

At step 258, computational deconvolution means are applied to the data set from step 258 to provide a three dimensional image of the sample with enhanced Z direction resolution.

As in the other embodiments, a phase matching step and an alignment step, may be included, as well as a step in which observed light is focused onto the image detection means.

Comparison of FIG. 34 through FIG. 36 shows that the method comprising the $I^5M$ embodiment involves a combination of steps from both the $I^2M$ and $I^3M$ embodiments, which reflects the similarity of the apparatus used in the three embodiments of the invention.

Computational algorithms applied at steps 226, 242 and 258 may include the application of external constraints.

Such constraints generally involve spatial confinement constraints in the deconvolution algorithm, and positivity of the emission intensity and of the fluorophore density when the invention is used for fluorescence microscopy.

The concepts related in the disclosure of the present invention may be used in combination with existing microscopy techniques to extend the lateral or XY resolution to a level which is greater than can presently be achieved. For example, the present invention may be used in combination with aspects of the existing technology Standing Wave Fluorescence Microscopy, hereinafter referred to as "SWFM", by using an "aperture synthesis" approach to SWFM.

Figure 37:
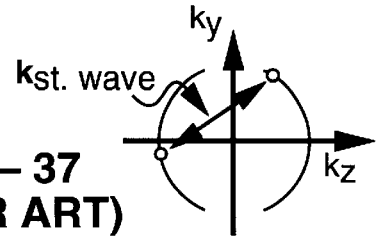
FIG. – 37 (PRIOR ART)
FIG. 37 is a graphic representation of the amplitude of two coherent beams of light in Fourier space, shown generally in the $k_Yk_Z$ plane.
Figure 38:
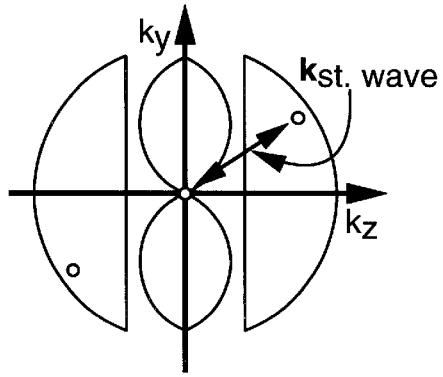
FIG. – 38 (PRIOR ART)
FIG. 38 is a graphic representation of the autocorrelation of the Fourier space amplitude shown in FIG. 37, shown generally in the $k_Yk_Z$ plane.

In SWFM, two coherent beams of light are used to illuminate a sample as related above. In Fourier space, the amplitude of these two beams is nonzero only at two points as shown in FIG. 37. The autocorrelation or intensity of the two points shown in FIG. 37 is related by FIG. 38 wherein there are three points which may lie anywhere within the outlined regions of FIG. 38.

Figure 39:
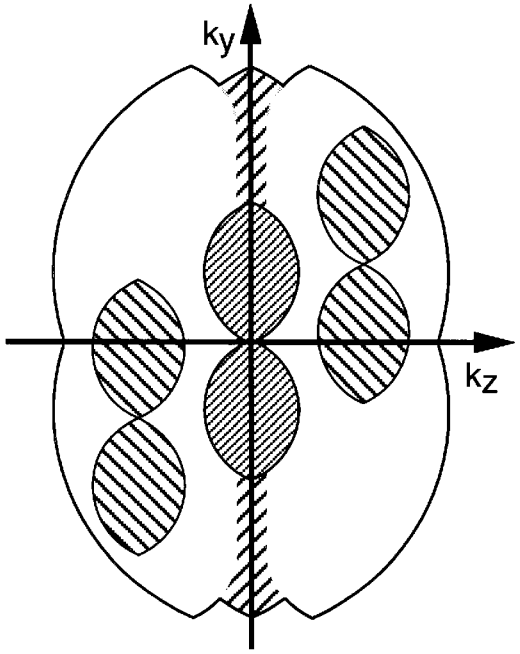
FIG. – 39 (PRIOR ART)
FIG. 39 is a graphic representation of the directly observable and displaced regions in Fourier space obtained by observation through a conventional single lens microscope, shown generally in the $k_Yk_Z$ plane.
Figure 40:
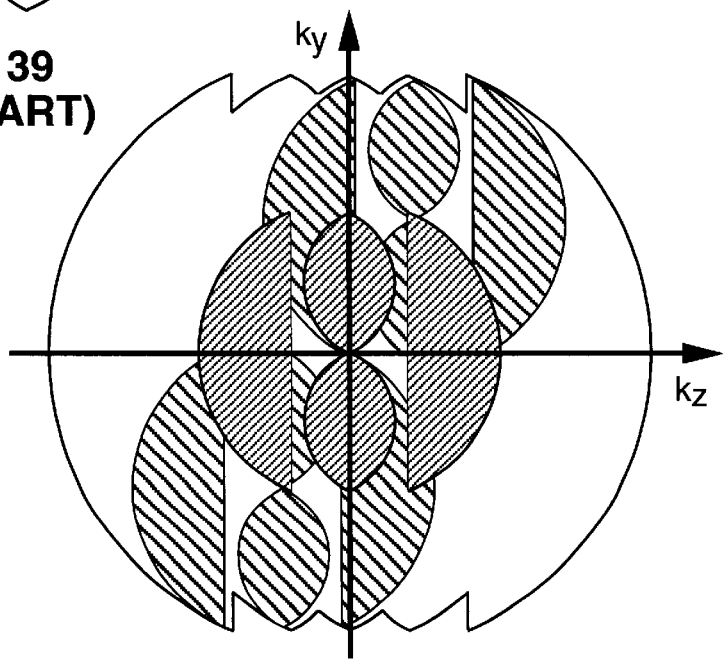
FIG. 40 is a graphic representation of the directly observable and displaced regions in Fourier space obtained by observation through the dual opposing objective lens arrangement of the present invention, shown generally in the $k_Yk_Z$ plane.

SWFM generally involves a standing wave aligned in the Z-direction. The present invention as described above already incorporates all of the Z-direction resolution that can in principle be achieved with SWFM. However, it is possible to achieve increased lateral or XY resolution using a form of SWFM wherein the *direction of the* standing wave is not [in] *parallel to* the Z-direction. For a certain standing wave direction and wavelength having wave vector $k_{st.\ wave}$, three image stacks at different phases of the standing wave are acquired. Alternatively, two image stacks at different phases and one reference stack without any standing wave may be used. The same reference stack could then be used for different standing wave angles, decreasing the total number of stacks that have to be acquired. Each of these image stacks by itself contains no Fourier components outside of the region of support of the optical transfer function or "directly observable region", but the information therein pertains to three different regions of sample information: the directly observable region itself, and two copies of the directly observable region displaced therefrom by $+k_{st.\ wave}$ and $-k_{st.\ wave}$ respectively, as shown in FIG. 39 and FIG. 40. FIG. 39 shows generally the directly observable and displaced regions as observed through a conventional single lens microscope, while FIG. 40 shows the directly observable and displaced regions as observed through the dual opposing objective lens arrangement of the present invention in its $I^2M$ embodiment. The central, finely hatched region in FIG. 39 and FIG. 40 represents the optical transfer function for the directly observable region, while the regions offset by $+k_{st.\ wave}$ and $-k_{st.\ wave}$ are shown as coarsely hatched. From the combined data set, it is possible to separate out these three components of sample information, and computationally move them to their appropriate positions in Fourier space. Repetition of this operation for different wave vectors $k_{st.\ wave}$ allows successive filling in of different parts of Fourier space, until a large region is covered. The extent of the region of Fourier space that can be accessed in this fashion is determined by the convolution of the directly observable region with the set of possible wave vectors $k_{st.\ wave}$ that can be created.

The set of wave vectors of the light that can be sent in through the objective lens(es) is limited by the light wavelength and the acceptance angle (numerical aperture) of the objective lenses exactly the same way as outgoing emission light as shown above in FIG. *12* through FIG. *19*. Thus, the set of possible standing wave wavevectors for a single objective lens system is shown FIG. 7, and the set of possible standing wave vectors for a dual objective lens system is shown by FIG. 8, wherein $\lambda$ is in this context understood to denote $\lambda_{excitation}$. The set of standing wave vectors for a dual objective lens system that lacks the ability to send both laser beams through the same lens is described by the side lobes of FIG. 8, where $\lambda$ is $\lambda_{excitation}$.

The procedure related above can be carried out either with conventional single-lens detection, in which case the phrase "directly observable region" in the previous paragraph refers to the region shown generally in FIG. 7, or with the dual-lens detection of the $I^2M$ embodiment of the present invention, for which case the same phrase refers to the region shown generally in FIG. 8. The corresponding regions of Fourier space that can be accessed with the above standing wave aperture synthesis procedure are shown graphically by the unfilled outlines in FIG. 39 and FIG. 40 for single and dual lens configurations respectively. Note in FIG. 39 that there is a disk-shaped region near the $k_yk_z$ plane, represented graphically by the hatched area along the $k_y$ axis, that cannot be accessed by the above standing wave aperture synthesis procedure in its conventional form unless the microscope has the ability to send both laser beams through the same objective lens. As seen in FIG. 40, the present invention accesses this region without requiring such an ability.

There are two further advantages to using the combination with the $I^2M$ embodiment of the invention. First, fewer image stacks (fewer different standing wave vectors $k_{st.\ wave}$) are required to achieve a reasonable coverage of the accessible regions of Fourier space. Second, the Z-resolution is increased, as can seen by the finely hatched region in FIG. 40 being longer in the $K_z$-direction than the corresponding region in FIG. 39. In fact, the accessible region in FIG. 40 is almost the entire sphere of radius $1/\lambda_{excitation}+1/\lambda_{emission}$, which represents all the spatial information that can be accessed by any farfield optical means.

An even larger transfer function, similar to the one for *the* $I^5M$ embodiment of the present invention, can be had in the above standing wave/aperture synthesis procedure, so that even fewer image stacks are needed for full coverage. This technique, which will hereinafter be referred to as four-beam standing wave microscopy, involves substitution of two mutually coherent point light sources, in a plane conjugate to the back focal plane of the objective, for the extended light source in a setup otherwise identical to that used in the $I^5M$ embodiment as shown in FIG. 4 through FIG. 6 and FIG. 29. These mutually coherent point sources could be, for example, focused laser beams or single mode optical fiber outputs, which in both cases may be supplied by a single laser. Because of the presence of a beam splitter, the resulting illumination at the sample consists of four mutually coherent plane waves. These will interfere to form an intensity field with structure in both the Z and the lateral (XY) directions. As described above regarding the $I^3M$ and $I^5M$ embodiments, the Z structure, because it is fixed in the sample reference frame, will simply give rise to an extension of the optical transfer function in the Z direction. The lateral structure, as related below, consists entirely of a sinusoidal modulation of the light intensity, so that the above aperture synthesis procedure can generally be directly applied.

Figure 41:
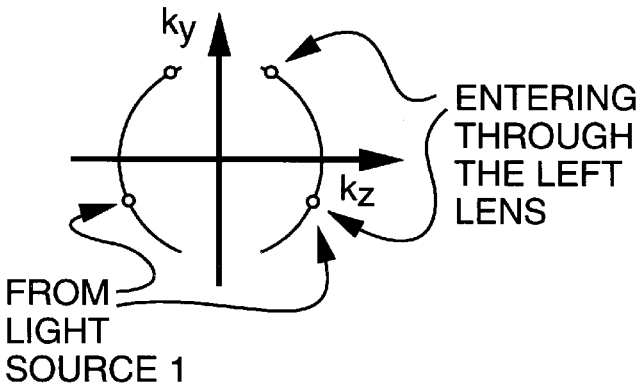
FIG. 41 is a graphic representation of the light amplitude distribution in Fourier space for the four beam standing wave microscopy technique, shown generally in the $k_Yk_Z$ plane.
Figure 42:
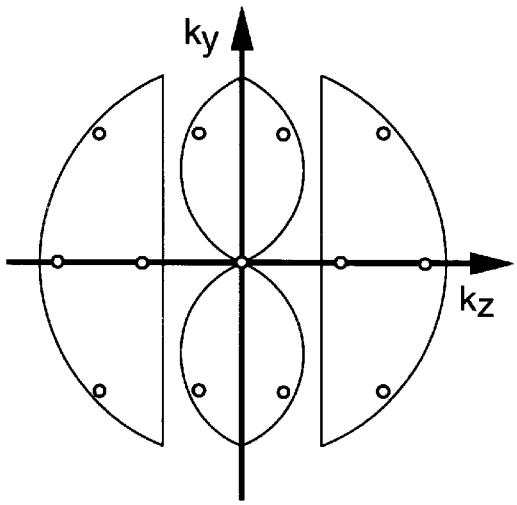
FIG. 42 is a graphic representation of the resulting intensity field from the autocorrelation of the function shown in FIG. 41, shown generally in the $k_Y$ $k_Z$ plane.

FIG. 41 shows graphically the light amplitude distribution in Fourier space for the four beam standing wave microscopy technique. The two point sources give rise to one plane wave each entering through the "left" objective lens, shown as the two right side dots in FIG. 41. Because of the beam splitter, the two point sources also provide mirror image beams entering through the right objective lens shown as the left side dots in FIG. 41. FIG. 42 shows the resulting intensity field from the autocorrelation of FIG. 41. This intensity field contains 13 points which correspond to all 12 possible difference vectors between the four points shown in FIG. 41, plus a point at the origin, which can be considered as the difference vector of any point with itself. The intensity field shown in FIG. 42 may appear complicated, but note that all 13 points lie either on the $k_z$ axis or are symmetrically placed on two lines parallel to it. This means that the light intensity is the sum of one component which is uniform in the XY plane (but which has structure in is the Z direction), and one component which is sinusoidally modulated in a lateral direction (and which has a different Z structure). Because of this fact, it is still possible to proceed with the information separation and aperture synthesis procedure as related above, with only slight modification due to the fact that the optical transfer functions for the modulated and the central information components are no longer identical.

Figure 43:
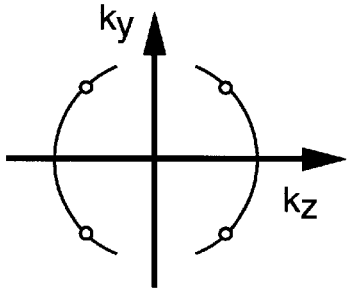
FIG. 43 is a graphic representation of the light amplitude distribution in Fourier space for the four beam standing wave microscopy technique which occurs if the two illuminating point sources are arranged symmetrically opposite each other in the aperture, shown generally in the $k_Yk_Z$ plane.
Figure 44:
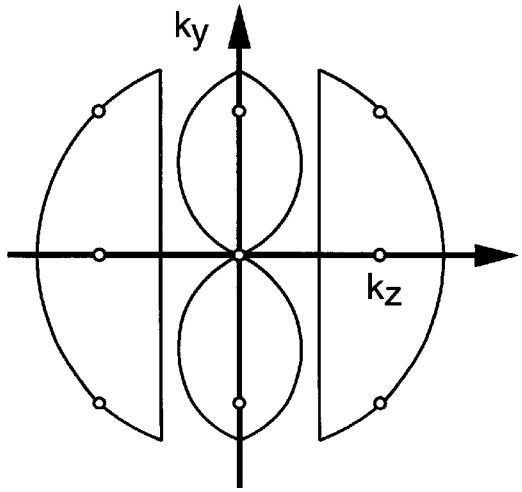
FIG. 44 is a graphic representation of the resulting intensity field from the autocorrelation of the function shown in FIG. 43, shown generally in the $k_Yk_Z$ plane.

There exists a special case where even the minor modification due to non-identical optical transfer functions is unnecessary, which occurs if the two point sources are arranged perfectly symmetrically (placed diametrically opposite each other in the lateral plane). In that case, some of the points in FIG. 42 coincide, resulting in three identical rows as shown by FIG. 43 and FIG. 44, which give rise to identical "central" and "modulation" transfer functions.

Figure 45:
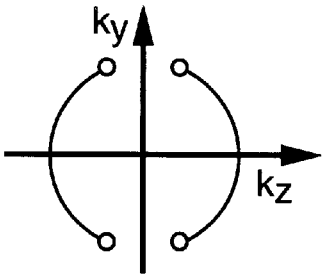
FIG. 45 is a graphic representation of the region of support for the illumination amplitude for two mutually coherent light sources which are located at diametrically opposite points on the edge of the aperture, shown generally in the $k_Yk_Z$ plane.
Figure 46:
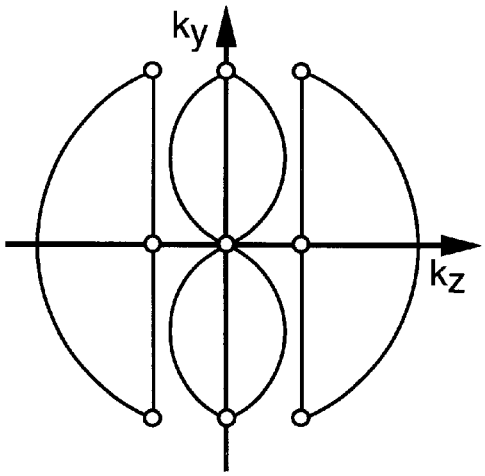
FIG. 46 shows the region of support for the illumination intensity corresponding to the function shown in to FIG. 45, shown generally in the $k_Yk_Z$ plane.
Figure 47:
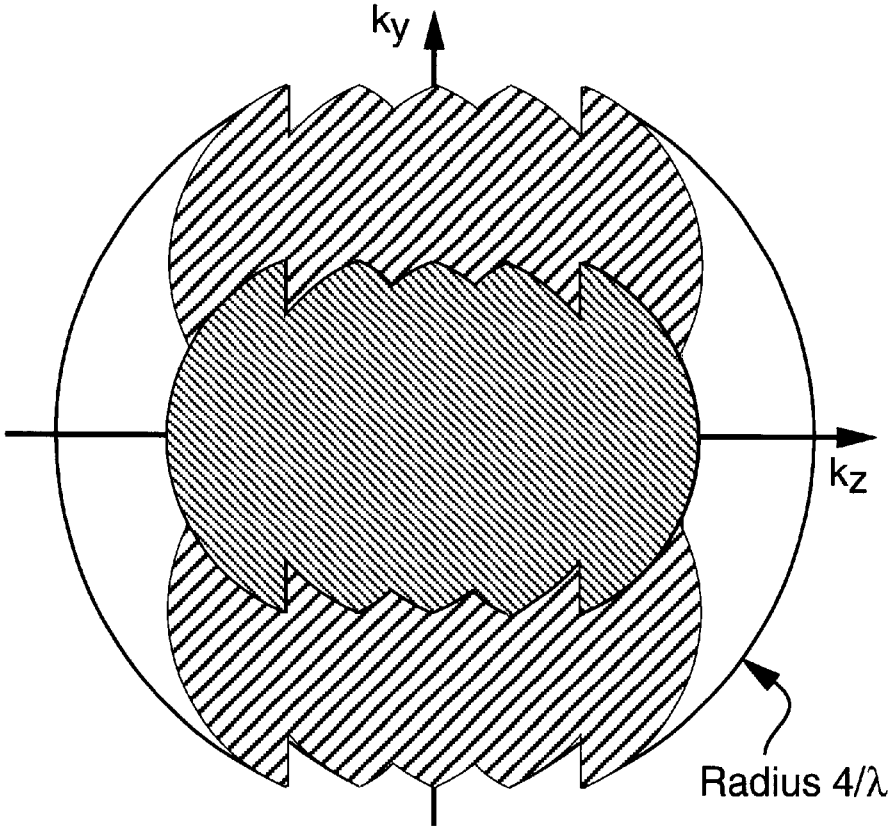
FIG. 47 is a graphic representation of the directly observable and displaced regions of Fourier space obtained using the four-beam standing wave microscopy technique, for the illumination arrangement described by FIG. 45 and FIG. 46, shown generally in the $k_Yk_Z$ plane.
Figure 48:
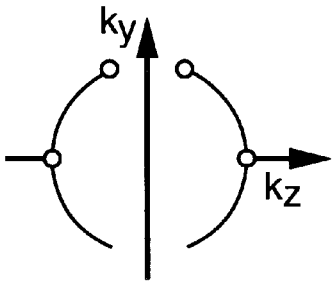
FIG. 48 is a graphic representation of the region of support for the illumination amplitude for two mutually coherent light sources wherein one light source is located at the center of the aperture and one light source is placed at the edge of the aperture, shown generally in the $k_Yk_Z$ plane.
Figure 49:
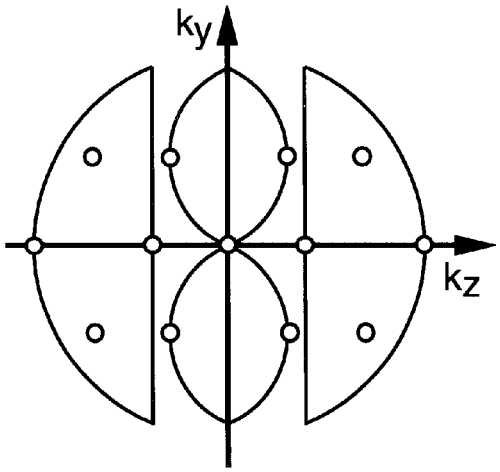
FIG. 49 shows the region of support for illumination intensity corresponding to the function shown in FIG. 48, shown generally in the $k_Yk_Z$ plane.
Figure 50:
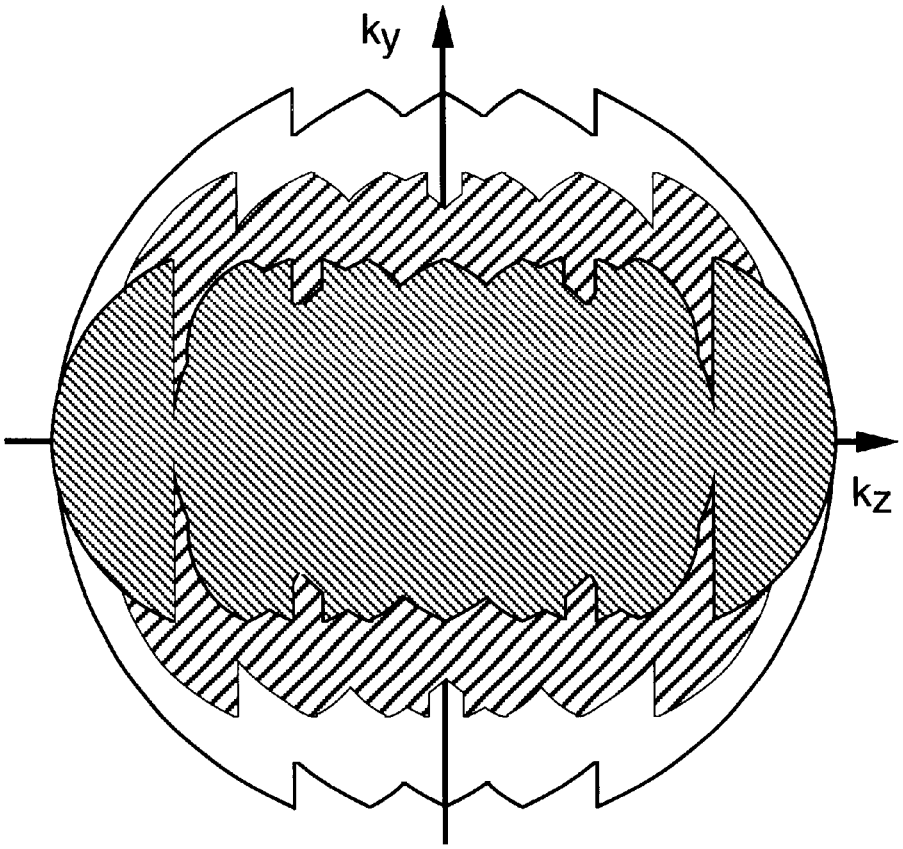
FIG. 50 is a graphic representation of directly observable and displaced regions of Fourier space obtained using the four-beam standing microscopy technique, for the illumination arrangement described by FIG. 48 and FIG. 49, shown generally in the $k_Yk_Z$ plane.

The effective optical transfer functions for the four beam standing wave microscopy technique depend on the particular positions of the two light sources in the back focal plane. FIG. 45 through FIG. 47 and FIG. 48 through FIG. 50 describe two examples. Shown generally in FIG. 45 is the region of support for the illumination amplitude for two mutually coherent light sources which are located at diametrically opposite points on the edge of the aperture. FIG. 46 shows the region of support for the illumination intensity corresponding to FIG. 45, and FIG. 47 shows *the* resulting optical transfer function. The central transfer function is shown as finely hatched, while the additional regions of sample information which can be obtained through modulation are shown as coarsely hatched regions. FIG. 48 shows the region of support for the illumination amplitude for two mutually coherent light sources wherein one light source is located at the center of the aperture and one light source is placed at the edge of the aperture. FIG. 49 shows the region of support for illumination intensity corresponding to FIG. 45, and FIG. 50 shows the resulting optical transfer function. The central transfer function is shown as finely hatched, while the coarsely hatched portions depict the regions of sample information available through modulation. Clearly, only very few data stacks of the types corresponding to FIG. 47 and/or FIG. 50 would be required to cover most of the accessible region of Fourier space.

In all the aperture synthesis techniques related above, one may need to determine the absolute phases of the various standing waves, which are likely to be unknown. They can easily be deduced by successively comparing the different information components in the areas where they overlap, as shown generally in FIG. 40, starting from the zero-phase "central" component.

As an alternative to the four-beam standing wave microscopy technique, one could use masks in the excitation light path, in planes conjugate to the image plane, to create lateral structure in the sample illumination. [This could] *For example, in the embodiments depicted in FIG. 26 through FIG. 29, lateral structure could be introduced into the illumination light by placing a mask in the position generally occupied by field stop 87. Using masks to provide the lateral structure could* allow aperture synthesis methods similar to the ones described above to be used without the need for a coherent light sources, which are limited by high price and limited choice of wavelengths available. *Those skilled in the art will appreciate that, while the abovementioned methods of improving lateral resolution by introducing lateral structure into the illumination light and applying aperture-synthesis computer processing to the resulting image data have been described here in the context of dual-objective-lens microscopes, these methods apply to conventional single-objective-lens microscopes as well.*

Any combination of the $I^2M$, $I^3M$, and $I^5M$ embodiments of the present invention, as well as the methods for lateral resolution enhancement related herein can be used sequentially on the same sample. The resulting information may then be combined by computer into a single reconstruction. For example, one may well want to combine data from microscopy using the $I^5M$ embodiment with data from the standing wave applications of the present invention described above.

Accordingly, it will be seen that the present invention provides a method and apparatus for three dimensional optical microscopy which has greater depth or Z direction resolution than has previously been attained for widefield microscopy. Although the description above contains many specificities, these should not be construed as limiting, but as merely providing illustrations of some of the presently preferred embodiments of this invention. Thus, the scope of the invention should be determined by the appended claims and their legal equivalents.

What is claimed is:

1. A three dimensional optical microscopy apparatus, comprising:

(a) first and second spaced-apart objective lenses;

(b) means for supporting a microscopy sample between said objective lenses;

(c) means for beam splitting and recombining light;

(d) first and second observation paths, said first observation path extending from said microscopy sample to said beam splitting and recombining means via said first objective lens, said second observation path extending from said microscopy sample to said beam splitting and recombining means via said second objective lens;

(e) a plurality of means for directing light, at least one of said light directing means positioned along each of said first and second observation paths to direct observed light from said microscopy sample along said first and second observation paths to said beam splitting and recombining means;

(f) optical path length balancing means for adjusting the optical path length of at least one of said first and second observation paths so as to make said optical path lengths of said first and second observation paths be closely equal; and (g) imaging means for detecting and recording images, said imaging means positioned to detect and record all or part of said observed light, said observed light having been combined by said beam splitting and recombining means.

2. An apparatus as recited in claim 1, further comprising means for positionally adjusting said microscopy sample relative to said objective lenses.

3. An apparatus as recited in claim 2, further comprising means for sensing position of said sample relative to said objective lenses.

4. An apparatus as recited in claim 1, further comprising means for positionally adjusting at least one of said objective lenses relative to said other objective lens.

5. An apparatus as recited in claim 4, further comprising means for sensing position of at least one of said objective lenses.

6. An apparatus as recited in claim 5, wherein said position adjusting means is responsive to said position sensing means.

7. An apparatus as recited in claim 1, wherein said optical path length balancing means comprises translation means for positionally adjusting at least one of said light directing means.

8. An apparatus as recited in claim 1, further comprising sample illuminating means for providing illuminating light to said sample, said illuminating means positioned to provide said illuminating light to said first objective lens.

9. An apparatus as recited in claim 8, further comprising selective transmittance and reflectance means for transmitting said observed light from said objective lenses toward said imaging means and reflecting said illuminating light away from said imaging means.

10. An apparatus as recited in claim 8, further comprising filtering means for transmitting said observed light from said objective lenses and filtering said illuminating light from said illuminating means.

11. An apparatus as recited in claim 8, further comprising selective transmittance and reflectance means for reflecting said observed light from said objective lenses toward said imaging means and transmitting said illuminating light away from said imaging means.

12. An apparatus as recited in claim 1, further comprising phase compensation means for correction of phase differences between different wavelength components of said observed light from said objective lenses.

13. An apparatus as recited in claim 1, further comprising means for focusing said light from said beam splitting and recombining means onto said imaging means.

14. An apparatus as recited in claim 1, further comprising means for aligning said sample relative to said objective lenses.

15. An apparatus as recited in claim 1, further comprising means for determining the amount of adjustment of said path length adjusting means.

16. An apparatus as recited in claim 1, further comprising sample illumination means for providing illuminating light to said sample, said illuminating means positioned to direct said illuminating light to said beam splitting and recombining means, said at least one of said light directing means positioned along each of said first and second observation paths to direct said illuminating light along said first and second observation paths to said microscopy sample via said first and second objective lenses.

17. An apparatus as recited in claim 16, wherein said optical path length balancing means comprises translation means for positionally adjusting at least one of said light directing means.

18. An apparatus as recited in claim 16, further comprising selective transmittance and reflectance means for transmitting said observed light from said objective lenses toward said imaging means and reflecting said illuminating light away from said imaging means.

19. An apparatus as recited in claim 16, further comprising phase compensation means for correction of phase differences between different wavelength components of said observed light and said illuminating light.

20. An apparatus as recited in claim 16, further comprising filtering means for transmitting said observed light from said objective lenses and filtering said illuminating light from said illuminating means.

21. An apparatus as recited in claim 16, further comprising means for focusing said observed light from said beam splitting and recombining means onto said imaging means.

22. An apparatus as recited in claim 16, further comprising means for positionally adjusting said microscopy sample relative to said objective lenses.

23. An apparatus as recited in claim 16, further comprising second imaging means for detecting and recording images, said second imaging means positioned to record a second beam of combined light from said first beam splitting and recombining means.

24. An apparatus as recited in claim 16, wherein said imaging means is positioned to record, as separate images, both beams of combined light from said beam splitting and recombining means.

25. An apparatus as recited in claim 16, further comprising selective transmittance and reflectance means for reflecting said observed light from said objective lenses toward said imaging means and transmitting said illuminating light away from said imaging means.

26. An apparatus as recited in claim 1, further comprising:

(a) sample illuminating means for providing illuminating light to said sample (b) first and second illumination paths; and (c) second means for beam splitting and recombining light;

(d) said illuminating means positioned to direct said illuminating light to said second beam splitting and recombining means, said first illumination path extending from said second beam splitting and recombining means to said microscopy sample via said first objective lens, said second illumination path extending from said second beam splitting and recombining means to said microscopy sample via said second objective lens, at least one of said light directing means positioned along each of said first and second illumination paths to direct said illuminating light to said microscopy sample along said first and second illumination paths via said first and second objective lenses.

27. An apparatus as recited in claim 26, wherein said optical path length balancing means comprises translation means for positionally adjusting at least one of said light directing means.

28. An apparatus as recited in claim 26, further comprising selective transmittance and reflectance means for transmitting said observed light from said objective lenses toward said imaging means and reflecting said illuminating light away from said imaging means.

29. An apparatus as recited in claim 26, further comprising phase compensation means for correction of phase differences between different wavelength components of said observed light and said illuminating light.

30. An apparatus as recited in claim 26, further comprising filtering means for transmitting said observed light from said objective lenses and filtering said illuminating light from said illuminating means.

31. An apparatus as recited in claim 26, further comprising means for positionally adjusting said first objective lens responsive to means for sensing position of said sample.

32. An apparatus as recited in claim 26, further comprising means for focusing said observed light from said first beam splitting and recombining means onto said image detection means.

33. An apparatus as recited in claim 26, further comprising means for positionally adjusting said microscopy sample relative to said objective lenses.

34. An apparatus as recited in claim 26, wherein said imaging means is positioned to record, as separate images, both beams of combined light from said first beam splitting and recombining means.

35. An apparatus as recited in claim 26, further comprising second optical path length balancing means, said second optical path length balancing means arranged for adjusting optical path lengths of at least one of said first and second illumination paths so as to make said optical path lengths of said first and second illumination paths be closely equal.

36. An apparatus as recited in claim 26, further comprising second imaging means for detecting and recording images, said second imaging means positioned to record a second beam of combined light from said first beam splitting and recombining means.

37. An apparatus as recited in claim 26, further comprising selective transmittance and reflectance means for reflecting said observed light from said objective lenses toward said imaging means and transmitting said illuminating light away from said imaging means.

38. A method for three-dimensional optical microscopy, comprising the steps of:

(a) placing a sample between first and second opposing objective lenses;

(b) focusing said objective lenses on a section of said sample;

(c) directing observed light from said section of said sample along first and second paths to imaging means for detecting and recording images, said first and second paths leading from said section of said sample to said imaging means through said first and second objective lenses respectively, and causing said observed light from said first and second paths to coincide on said imaging means;

(d) adjusting optical lengths of at least one of said first and second paths so as to make said first and second optical path lengths be closely equal, thereby causing said observed light from said first and second objective lenses to interfere on said imaging means;

(e) recording said interfering observed light on said imaging means;

(f) focusing said objective lenses on another section of said sample; and (g) repeating steps (c), (d), (e) and (f) until a plurality of sections of said sample have been observed and recorded, forming a data set of recorded images.

39. A method for three-dimensional optical microscopy according to [claimed] *claim* 38, further comprising the step of applying means for computational deconvolution to said data set of recorded images to obtain a three-dimensional image of said sample.

40. A method for three-dimensional optical microscopy according to claim 38, wherein step (c) is carried out by using a plurality of means for directing light and at least one means for beam splitting and recombining light.

41. A method for three-dimensional optical microscopy according to claim 38, further comprising the step of directing illuminating light to said sample through said first objective lens.

42. A method for three-dimensional optical microscopy according to claim 38, further comprising the step of preventing said illuminating light from reaching said detection means.

43. A method for three-dimensional optical microscopy according to claim 38, further comprising the step of matching the phases of different wavelength components of said observed light.

44. A method for three-dimensional optical microscopy according to claim 38, further comprising the step of aligning said sample between said first and second objective lenses.

45. A method for three-dimensional optical microscopy, comprising the steps of:

(a) placing a sample between first and second opposing objective lenses;

(b) focusing said first and second objective lenses onto a section of said sample;

(c) directing illuminating light from an extended, spatially incoherent light source along first and second illumination paths to said section of said sample, said first illumination path extending from said light source to said section of said sample via said first objective lens, said second illumination path extending from said light source to said section of said sample via said second objective lens;

(d) directing observed light from said sample along first and second observation paths to imaging means for detecting and recording images, said first and second observation paths extending from said section of said sample to said imaging means via said first and second objective lenses respectively, and causing said observed light from said first and second observation paths to coincide on said imaging means;

(e) adjusting optical lengths of at least one of said first and second illumination paths, so as to make said optical lengths of said first and second illumination paths be closely equal thereby causing said illuminating light from said first and second illumination paths to interfere in said section of said sample;

(f) recording said observed light on said imaging means;

(g) refocusing said first and second objective lenses onto another section of said sample; and (h) repeating steps (c), (d), (e) (f) and (g) until a plurality of sections of said sample have been observed and recorded, forming a data set of recorded images.

46. A method for three-dimensional optical microscopy according to claim 45, further comprising the step of applying means for computational deconvolution to said data set of recorded images to obtain a three-dimensional image of said sample.

47. A method for three-dimensional optical microscopy according to claim 45, wherein step (c) is carried out by directing said illuminating light from said extended, spatially incoherent light source to means for beam splitting and recombining light and directing said illuminating light from said beam splitting and recombining means along said first and second paths to said sample by a plurality of means for directing light.

48. A method for three-dimensional optical microscopy according to claim 47, wherein said first and second observation paths include said beam splitting and recombining means, and wherein segments of said first and second illumination paths that extend between said beam splitting and recombining means and said section of said sample are identical to segments of said first and second observation paths that extend between said section of said sample and said beam splitting and recombining means, respectively.

49. A method for three-dimensional optical microscopy according to claim 45, further comprising the step of preventing said illuminating light from reaching said detection means.

50. A method for three-dimensional optical microscopy according to claim 45, further comprising the step of matching the phases of said illuminating light and said observed light.

51. A method for three-dimensional optical microscopy according to claim 45, further comprising the step of aligning said sample between said first and second objective lenses.

52. A method for three-dimensional optical microscopy according to claim 45, wherein step (d) is carried out by directing said observed light from said section of said sample along said first and second observation paths to means for beam splitting and recombining light and directing said observed light from said beam splitting and recombining means to said imaging means by a plurality of means for directing[,] light, said observed light from said first and second observation paths having been combined by said beam splitting and recombining means.

53. A method for three-dimensional optical microscopy, comprising the steps of:

(a) placing a sample between first and second opposing objective lenses;

(b) focusing said first and second objective lenses onto a section of said sample;

(c) directing illuminating light from an extended, spatially incoherent light source along first and second illumination paths to said section of said sample, said first illumination path extending from said light source to said section of said sample via said first objective lens, said second illumination path extending from said light source to said section of said sample via said second objective lens;

(d) directing observed light from at least one of said first and second objective lenses to imaging means for detecting and recording images;

(e) adjusting optical lengths of at least one of said first and second illumination paths, so as to make said optical lengths of said first and second illumination paths be closely equal, thereby causing said illuminating light from said first and second illumination paths to interfere in said section of said sample;

(f) recording said observed light on said imaging means;

(g) refocusing said first and second objective lenses onto another section of said sample; and (h) repeating steps (c), (d), (e), (f) and (g) until a plurality of sections of said sample have been observed and recorded, forming a data set of recorded images.

54. A method for three-dimensional optical microscopy according to claim 53, further comprising the step of applying means for computational deconvolution to said data set of recorded images to obtain a three-dimensional image of said sample.

55. A method for three-dimensional optical microscopy according to claim 53, wherein step (c) is carried out by directing said illuminating light from said extended, spatially incoherent light source to means for beam splitting and recombining light and directing said illuminating light from said beam splitting and recombining means along said first and second illumination paths by a plurality of means for directing light.

56. A method for three-dimensional optical microscopy according to claim 53, further comprising the step of preventing said illuminating light from reaching said detection means.

57. A method for three-dimensional optical microscopy according to claim 53, further comprising the step of matching the phases of different wavelength components of said illuminating light.

58. A method for three-dimensional optical microscopy according to claim 53, further comprising the step of aligning said sample between said first and second objective lenses.

59. A three dimensional optical microscopy apparatus, comprising:

(a) a first objective lens and a second objective lens, said objective lenses mounted opposite to each other;

(b) means for supporting a microscopy sample between said objective lenses;

(c) means for beam splitting light;

(d) first and second optical paths, said first optical path extending from said beam splitting means to said microscopy sample via said first objective lens, said second optical path extending from said beam splitting means to said microscopy sample via said second objective lens;

(e) illuminating means for producing extended, spatially incoherent light, said illuminating means positioned to provide illuminating light to said beam splitting means;

(f) a plurality of means for directing light, at least one of said light directing means positioned along each of said first and second optical paths to direct illuminating light from said beam splitting means along said first and second optical paths to said sample;

(g) optical path length balancing means for adjusting optical path lengths of at least one of said first and second optical paths, so as to make said optical path lengths of said first and second optical paths be closely equal; and (h) imaging means for detecting and recording images, said imaging means positioned to record observed light from at least one of said objective lenses.

60. An apparatus as recited in claim 59, further comprising means for positionally adjusting said microscopy sample relative to said objective lenses.

61. An apparatus as recited in claim 60, further comprising means for sensing position of said sample relative to said objective lenses.

62. An apparatus as recited in claim 59, further comprising means for positionally adjusting at least one of said objective lenses relative to said other objective lens.

63. An apparatus as recited in claim 62, further comprising means for sensing position of at least one of said objective lenses.

64. An apparatus as recited in claim 59, wherein said optical path length balancing means comprises translation means for positionally adjusting at least one of said light directing means.

65. An apparatus as recited in claim 59, further comprising selective transmittance and reflectance means for transmitting said observed light from said objective lenses toward said imaging means and reflecting said illuminating light away from said imaging means.

66. An apparatus as recited in claim 59, further comprising filtering means for transmitting observed light from said objective lenses and filtering said illuminating light from said illuminating means.

67. An apparatus as recited in claim 59, further comprising phase compensation means for correction of phase differences between different wavelength components of said illuminating light from said illuminating means.

68. An apparatus as recited in claim 59, further comprising means for focusing said observed light from said objective lenses onto said imaging means.

69. An apparatus as recited in claim 59, further comprising means for determining the amount of adjustment of said path length adjusting means.

70. An apparatus as recited in claim 59, further comprising selective transmittance and reflectance means for reflecting said observed light from said objective lenses toward said imaging means and transmitting said illuminating light away from said imaging means.

*71. An apparatus as recited in claim 1, further comprising means for providing spatially structured illuminating light to said sample, said means for providing spatially structured illuminating light comprising means for providing at least two mutually coherent beams of light to said sample, said at least two mutually coherent beams of light arranged so as to interfere with each other at said sample.*

*72. An apparatus as recited in claim 71, wherein said spatially structured illuminating light comprises a standing wave.*

*73. An apparatus as recited in claim 72, wherein said standing wave has a direction, wherein said first and second objective lenses have a common optic axis, and wherein said direction of said standing wave is parallel to said optic axis.*

*74. An apparatus as recited in claim 72, wherein said standing wave has a direction, wherein said first and second objective lenses have a common optic axis, and wherein said direction of said standing wave is perpendicular to said optic axis.*

*75. An apparatus as recited in claim 72, wherein said standing wave has a direction, wherein said first and second objective lenses have a common optic axis, and wherein said direction of said standing wave is neither parallel nor perpendicular to said optic axis.*

*76. An apparatus as recited in claim 1, further comprising means for providing spatially structured illuminating light to said sample, said means for providing spatially structured illuminating light comprising means for providing two mutually coherent beams of light to said sample, said two mutually coherent beams of light arranged so as to interfere with each other at said sample, said two beams of light directed to said sample through said first objective lens.*

*77. An apparatus as recited in claim 71, wherein at least one of said at least two beams of light is directed to said sample through said first objective lens, and wherein at least one of said at least two beams of light is directed to said sample through said second objective lens.*

*78. An apparatus as recited in claim 59, wherein said illuminating means comprises means for producing spatially structured illuminating light, and wherein said means for producing spatially structured illuminating light comprises light source means for providing light, an illumination path from said light source means to said beam splitting means, and at least one mask located along said illumination path.*

*79. An apparatus as recited in claim 71, further comprising structure altering means for altering spatial structure of said spatially structured illuminating light.*

*80. An apparatus as recited in claim 79, wherein said structure altering means comprises means for altering a phase of spatial structure of said spatially structured illuminating light.*

*81. An apparatus as recited in claim 80, wherein said structure altering means further comprises means for altering an orientation of spatial structure of said spatially structured illuminating light.*

*82. An apparatus as recited in claim 79, further comprising computational processing means for processing a plurality of images from said imaging means to produce a reconstruction of said sample with improved resolution.*

*83. An apparatus as recited in claim 78, wherein at least one of said at least one masks is located at a position that is conjugate to an image plane of at least one of said first and second objective lenses.*

*84. An apparatus as recited in claim 78, further comprising structure altering means for altering spatial structure of said spatially structured illuminating light.*

*85. An apparatus as recited in claim 78, further comprising computational processing means for processing a plurality of images from said imaging means to produce a reconstruction of said sample with improved resolution.*

*86. An apparatus as recited in claim 1, further comprising means for providing spatially structured illuminating light to said sample, said means for providing spatially structured illuminating light comprising light source means for providing light, an illumination path from said light source means to said sample, and at least one mask located along said illumination path.*

*87. An apparatus as recited in claim 86, wherein at least one of said at least one masks is positioned at a plane that is conjugate to an image plane of at least one of said first and second objective lenses.*

*88. An apparatus as recited in claim 86, wherein said light source means comprises an extended, spatially incoherent light source.*

*89. An apparatus as recited in claim 16, wherein said illuminating means comprises means for providing spatially structured illuminating light to said sample, said means for providing spatially structured illuminating light comprising light source means for providing light, an illumination path from said light source means to said beam splitting and recombining means, and at least one mask located along said illumination path.*

*90. An apparatus as recited in claim 86, further comprising means for processing a plurality of images from said imaging means to produce a reconstruction of said sample with improved resolution.*

*91. An apparatus as recited in claim 16, wherein said illuminating means comprises means for providing spatially structured illuminating light to said sample, said means for providing spatially structured illuminating light comprising means for providing at least two mutually coherent beams of light to said beam splitting and recombining means, said at least two mutually coherent beams of light arranged so as to interfere with each other at said sample.*

*92. An apparatus as recited in claim 89, further comprising structure altering means for altering spatial structure of said spatially structured illuminating light.*

*93. An apparatus as recited in claim 91, further comprising means for altering a phase of spatial structure of said spatially structured illuminating light.*

*94. An apparatus as recited in claim 91, further comprising means for altering a direction of spatial structure of said spatially structured illuminating light.*

*95. An apparatus as recited in claim 26, wherein said illuminating means comprises means for providing spatially structured illuminating light to said sample, said means for providing spatially structured illuminating light comprising means for providing at least two mutually coherent beams of light to said beam splitting and recombining means, said at least two mutually coherent beams of light arranged so as to interfere with each other at said sample.*

*96. An apparatus as recited in claim 95, further comprising structure altering means for altering spatial structure of said spatially structured illuminating light.*

*97. An apparatus as recited in claim 95, further comprising means for altering a phase of spatial structure of said spatially structured illuminating light.*

*98. An apparatus as recited in claim 95, further comprising means for altering a direction of spatial structure of said spatially structured illuminating light.*

*99. An apparatus as recited in claim 89, wherein at least one of said least one masks is disposed at a position that is conjugate to an image plane of at least one of said first and second objective lenses.*

*100. An apparatus as recited in claim 89, wherein said light source means comprises an extended, spatially incoherent light source.*

*101. An apparatus as recited in claim 91, wherein said at least two mutually coherent beams of light emanate from at least two mutually coherent point sources of light located at positions approximately conjugate to a back focal plane of at least one of said first and second objective lenses.*

*102. An apparatus as recited in claim 91, further comprising structure altering means for altering spatial structure of said spatially structured illuminating light.*

*103. An apparatus as recited in claim 26, wherein said illuminating means comprises means for providing spatially structured illuminating light to said sample, said means for providing spatially structured illuminating light comprising light source means for providing light, an illumination path from said light source means to said second beam splitting and recombining means, and at least one mask located along said illumination path.*

*104. An apparatus as recited in claim 103, wherein at least one of said at least one masks is disposed at a position that is conjugate to an image plane of at least one of said first and second objective lenses.*

*105. An apparatus as recited in claim 103, further comprising structure altering means for altering spatial structure of said spatially structured illuminating light.*

*106. An apparatus as recited in claim 103, wherein said light source means comprises an extended, spatially incoherent light source.*

*107. An apparatus as recited in claim 95, wherein said at least two mutually coherent beams of light emanate from at least two mutually coherent point sources of light located at positions approximately conjugate to a back focal plane of at least one of said first and second objective lenses.*

*108. A method for three-dimensional microscopy as recited in claim 45, further comprising the step of introducing lateral structure into said illuminating light, and further comprising the step of computationally processing said data set of recorded images to obtain a reconstruction of said sample with improved resolution.*

*109. A method for three-dimensional microscopy as recited in claim 108, wherein said reconstruction of said sample possesses improved lateral resolution.*

*110. A method for three-dimensional microscopy as recited in claim 108, wherein the step of introducing lateral structure into said illuminating light is carried out by directing said illuminating light past at least one mask.*

*111. A method for three-dimensional microscopy as recited in claim 53, further comprising the step of introducing lateral structure into said illuminating light, and further comprising the step of computationally processing said data set of recorded images to obtain a reconstruction of said sample with improved resolution.*

*112. A method for three-dimensional microscopy as recited in claim 111, wherein said reconstruction of said sample possesses improved lateral resolution.*

*113. A method for three-dimensional microscopy as recited in claim 112, wherein the step of introducing lateral structure into said illuminating light is carried out by directing said illuminating light past at least one mask.*

*114. An apparatus for optical microscopy, comprising:*

*(a) means for supporting a sample;*

*(b) means for providing spatially structured illuminating light to said sample, said spatially structured illuminating light containing lateral structure, said means for providing spatially structured illuminating light comprising light source means for producing light, an illuminating path from said light source means to said sample, and at least one mask located along said illuminating path;*

*(c) optical magnification means for producing magnified images of said sample illuminated by said spatially structured illumination light;*

*(d) imaging means for detecting and recording said magnified images of said sample; and*

*(e) processing means for processing said recorded images from said imaging means to obtain a reconstruction of said sample with improved resolution including improved lateral resolution, said processing means arranged to cause information components from said recorded images to assume new positions in Fourier space.*

*115. An apparatus as recited in claim 114, further comprising structure altering means for altering spatial structure of said spatially structured illuminating light.*

*116. An apparatus as recited in claim 114, further comprising means for altering a phase of spatial structure of said spatially structured illuminating light.*

*117. An apparatus as recited in claim 114, further comprising means for altering a direction of spatial structure of said spatially structured illuminating light.*

*118. An apparatus as recited in claim 114, wherein said means for providing spatially structured illuminating light further comprises polarizing means located along said illuminating path.*

*119. An apparatus as recited in claim 114, further comprising focusing means for refocusing said optical magnification means relative to said sample to allow said optical magnification means to produce refocused images of said sample, said imaging means arranged to detect and record a multiplicity of said refocused images, said processing means arranged to process said multiplicity of recorded images from said imaging means to obtain a three-dimensional reconstruction of said sample.*

*120. An apparatus as recited in claim 114, wherein at least one of said at least one mask is positioned at a plane that is conjugate to an image plane of said optical magnification means.*

*121. An apparatus as recited in claim 114, wherein said light source means comprises an extended, spatially incoherent light source.*

*122. An apparatus for optical microscopy, comprising:*

*(a) means for supporting a sample;*

*(b) means for providing spatially structured illuminating light to said sample, said spatially structured illuminating light containing lateral structure, said means for providing spatially structured illuminating light comprising means for providing at least two mutually coherent beams of light to said sample, said at least two mutually coherent beams of light arranged so as to interfere with each other at said sample;*

*(c) optical magnification means for producing magnified images of said sample illuminated by said spatially structured illumination light;*

*(d) imaging means for detecting and recording said magnified images of said sample; and*

*(e) processing means for processing said recorded images from said imaging means to obtain a reconstruction of said sample with improved resolution, including improved lateral resolution.*

*123. An apparatus as recited in claim 122, further comprising structure altering means for altering spatial structure of said spatially structured illuminating light.*

*124. An apparatus as recited in claim 122, further comprising means for altering a phase of spatial structure of said spatially structured illuminating light.*

*125. An apparatus as recited in claim 122, further comprising means for altering a direction of spatial structure of said spatially structured illuminating light.*

*126. An apparatus as recited in claim 122, wherein said spatially structured illuminating light has at least one characteristic wave vector, said apparatus further comprising means for altering at least one of said at least one characteristic wave vector.*

*127. An apparatus as recited in claim 122, wherein said at least two mutually coherent beams of light emanate from at least two mutually coherent sources of light, said at least two mutually coherent sources of light located at positions approximately conjugate to a back focal plane of said optical magnification means.*

*128. An apparatus as recited in claim 122, wherein said spatially structured illuminating light further contains axial structure.*

*129. An apparatus as recited in claim 122, wherein said reconstruction further possesses improved axial resolution.*

*130. An apparatus as recited in claim 122, further comprising focusing means for refocusing said optical magnification means relative to said sample to allow said optical magnification means to produce refocused images of said sample, said imaging means arranged to detect and record a multiplicity of said refocused images, said processing means arranged to process said multiplicity of recorded images from said imaging means to obtain a three-dimensional reconstruction of said sample.*

*131. A method of optical microscopy comprising the steps of:*

*(a) placing a luminescent sample in a microscope containing image detecting and recording means;*

*(b) illuminating said sample with an illumination pattern that contains lateral structure;*

*(c) recording at least one image of said sample using said image detecting and recording means;*

*(d) altering said illumination pattern at least one time, each time recording at least one image of said sample illuminated with said altered illumination pattern;*

*(e) collecting said images into a data set; and*

*(f) computationally processing said data set to obtain a reconstruction of said sample with improved resolution, including improved lateral resolution, said step of computationally processing said data comprising the steps of separating a plurality of information components, causing said information components to assume new positions in Fourier space, and recombining said information components.*

*132. A method for optical microscopy as recited in claim 131, wherein said reconstruction of said sample possesses improved lateral resolution.*

*133. A method for optical microscopy as recited in claim 131, wherein step (b) is carried out by directing illuminating light past at least one mask to said sample.*

*134. A method for optical microscopy as recited in claim 131, wherein step (b) is carried out by causing at least two mutually coherent beams of light to interfere at said sample.*

*135. A method for optical microscopy as recited in claim 131, wherein step (d) comprises the step of altering a phase of said illumination pattern at least one time.*

*136. A method for optical microscopy as recited in claim 135, further comprising the step of applying computational deconvolution means to said data set.*

*137. A method for optical microscopy as recited in claim 131, wherein step (d) comprises the step of altering a direction of said illumination pattern at least one time.*

*138. A method for optical microscopy as recited in claim 131, further comprising the step of illuminating said sample with laterally uniform illumination and recording at least one image of said sample illuminated by said laterally uniform illumination.*

*139. A method for optical microscopy as recited in claim 138, further comprising the steps of*

*refocusing said microscope relative to said sample at least one time;*

*each time said microscope is thus refocused*

*(i) repeating steps (b), (c), (d) and (e) and*

*(ii) illuminating said sample with laterally uniform illumination and recording at least one image of said sample illuminated by said laterally uniform illumination;*

*collecting said data sets into a three-dimensional data set; and*

*processing said three-dimensional data set to generate a three-dimensional reconstruction of said sample.*

*140. A method for optical microscopy as recited in claim 131, further comprising the steps of refocusing said microscope relative to said sample at least one time, repeating steps (b), (c), (d) and (e) each time the microscope is thus refocused, collecting said data sets into a three-dimensional data set, and processing said three-dimensional data set to generate a three-dimensional reconstruction of said sample.*

*141. A method for optical microscopy as recited in claim 131, wherein step (a) is carried out by placing said sample in a microscope having first and second opposing objective lenses, and wherein step (b) is carried out by providing illuminating light that contains lateral structure, splitting said illuminating light into first and second beams of structured illuminating light, directing said first beam of structured illuminating light to said sample along a first illuminating path through said first obiective lens, directing said second beam of structured illuminating light to said sample along a second illuminating path through said second objective lens, to allow said first and second beams of structured illuminating light to interfere at said sample.*

* * * * *